US012676099B2

(12) United States Patent
Lee et al.

(10) Patent No.: US 12,676,099 B2
(45) Date of Patent: Jul. 7, 2026

(54) ELECTRONIC DEVICE AND METHOD CONTROLLING SIGNAL PROVIDED TO PROCESSOR

(71) Applicant: Samsung Electronics Co., Ltd., Suwon-si (KR)

(72) Inventors: Jaesung Lee, Suwon-si (KR); Kyounghwan Kwon, Suwon-si (KR); Jongkon Bae, Suwon-si (KR); Donghwy Kim, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/229,003

(22) Filed: Jun. 5, 2025

(65) Prior Publication Data

US 2025/0299618 A1 Sep. 25, 2025

Related U.S. Application Data

(63) Continuation of application No. 18/486,363, filed on Oct. 13, 2023, now Pat. No. 12,340,726, and a (Continued)

(30) Foreign Application Priority Data

Sep. 30, 2022 (KR) ........................ 10-2022-0125365
Jan. 4, 2023 (KR) ........................ 10-2023-0001471

(Continued)

(51) Int. Cl.
*G09G 3/20* (2006.01)
*G09G 5/12* (2006.01)

(52) U.S. Cl.
CPC ............. *G09G 3/2092* (2013.01); *G09G 3/20* (2013.01); *G09G 5/12* (2013.01);

(Continued)

(58) Field of Classification Search
CPC ............................................. G09G 2340/0435
See application file for complete search history.

(56) References Cited

U.S. PATENT DOCUMENTS 5,948,091 A 9/1999 Kerigan et al.
7,015,902 B2 3/2006 Nagai (Continued)

FOREIGN PATENT DOCUMENTS

JP 7387682 B2 11/2023
KR 10-2008-0055653 6/2008

(Continued)

OTHER PUBLICATIONS

U.S. Appl. No. 18/486,363, filed Oct. 13, 2023; Lee et al.

(Continued)

*Primary Examiner* — Bipin Gyawali
(74) *Attorney, Agent, or Firm* — Nixon & Vanderhye P.C.

(57) ABSTRACT

An electronic device is provided. The electronic device includes a processor. The electronic device includes a display including a display panel and a display driver circuit that includes memory. The display driver circuit is configured to identify an event for a display on the display panel. The display driver circuit is configured to, in response to the event of a first type that executes the display through the memory, change, at a timing before a reference time from a start timing of a scan for the display, a state of a signal provided from the display driver circuit to the processor from a first state indicating to enable an image transmission to the display driver circuit to a second state indicating to disable the image transmission. The display driver circuit is configured to, in response to the event of a second type that executes the display by bypassing the memory, change, at (Continued)

the start timing, the state of the signal provided from the display driver circuit to the processor from the first state to the second state.

20 Claims, 16 Drawing Sheets

Related U.S. Application Data continuation of application No. PCT/KR2023/014939, filed on Sep. 26, 2023.

(30) Foreign Application Priority Data

Jan. 11, 2023 (KR) ........................ 10-2023-0004347
Feb. 8, 2023 (KR) ........................ 10-2023-0016868
Mar. 17, 2023 (KR) ........................ 10-2023-0035417
Sep. 25, 2023 (WO) ................ PCT/KR2023/014711

(52) U.S. Cl.
CPC ............... *G09G 2320/0247* (2013.01); *G09G 2320/0257* (2013.01); *G09G 2340/0435* (2013.01); *G09G 2370/10* (2013.01)

(56) References Cited

U.S. PATENT DOCUMENTS

| | | | |
|---|---|---|---|
| 8,451,279 | B2 | 5/2013 | Gorla et al. |
| 8,654,132 | B2 | 2/2014 | Gorla et al. |
| 8,878,995 | B2 | 11/2014 | Cha et al. |
| 9,704,215 | B2 | 7/2017 | Kim et al. |
| 9,830,880 | B1 | 11/2017 | Wyatt |
| 10,096,286 | B2 | 10/2018 | Cho et al. |
| 10,430,918 | B2 | 10/2019 | Kim et al. |
| 10,504,442 | B2 | 12/2019 | Yoo |
| 10,609,276 | B2 | 3/2020 | Lee et al. |
| 10,614,772 | B2 | 4/2020 | Zhao et al. |
| 10,803,785 | B2 | 10/2020 | Hong et al. |
| 10,810,927 | B2 | 10/2020 | Lee et al. |
| 11,205,400 | B1 | 12/2021 | Jang |
| 11,270,615 | B2 | 3/2022 | Choi et al. |
| 11,335,239 | B2 | 5/2022 | Bae et al. |
| 11,412,173 | B2 | 8/2022 | Yamamoto et al. |
| 11,538,438 | B2 | 12/2022 | Bae et al. |
| 11,721,272 | B2 | 8/2023 | Lee |
| 12,062,316 | B2 | 8/2024 | Kim |
| 2010/0053182 | A1 | 3/2010 | Jeon et al. |
| 2013/0057763 | A1 | 3/2013 | Cha |
| 2013/0235055 | A1 | 9/2013 | Kim et al. |
| 2015/0029201 | A1 | 1/2015 | Cha et al. |
| 2015/0371609 | A1 | 12/2015 | Choi et al. |
| 2016/0078846 | A1 | 3/2016 | Liu et al. |
| 2017/0193971 | A1 | 7/2017 | Bi et al. |
| 2018/0061308 | A1 | 3/2018 | Bae |
| 2019/0340973 | A1 | 11/2019 | Kim |
| 2020/0066226 | A1 | 2/2020 | Han |
| 2021/0210003 | A1* | 7/2021 | Kim ..................... G09G 3/2014 |
| 2021/0312871 | A1 | 10/2021 | Park et al. |
| 2022/0189408 | A1 | 6/2022 | Jo et al. |
| 2023/0018546 | A1* | 1/2023 | Kim ........................ G06F 3/147 |
| 2024/0038172 | A1 | 2/2024 | Sang et al. |

FOREIGN PATENT DOCUMENTS

| | | | |
|---|---|---|---|
| KR | 2010-0025095 | A | 3/2010 |
| KR | 10-1158876 | | 6/2012 |
| KR | 10-2013-0027094 | | 3/2013 |
| KR | 2013-0027094 | A | 3/2013 |
| KR | 2015-0007948 | A | 1/2015 |
| KR | 10-2016-0012022 | | 2/2016 |
| KR | 10-2017-0064292 | | 6/2017 |
| KR | 10-2017-0087086 | | 7/2017 |
| KR | 10-2018-0024621 | | 3/2018 |
| KR | 10-1885331 | | 8/2018 |
| KR | 10-1885331 | B1 | 8/2018 |
| KR | 10-2018-0118209 | | 10/2018 |
| KR | 10-2019-0003334 | | 1/2019 |
| KR | 20200034320 | A | 3/2020 |
| KR | 2021-0017468 | A | 2/2021 |
| KR | 10-2305765 | B1 | 9/2021 |
| KR | 10-2022-0006729 | A | 1/2022 |
| KR | 2022-0048409 | A | 4/2022 |
| KR | 10-2022-0088213 | A | 6/2022 |
| KR | 10-2417633 | B1 | 7/2022 |
| KR | 10-2442662 | B1 | 9/2022 |
| KR | 10-2480895 | B1 | 12/2022 |
| KR | 10-2549463 | B1 | 6/2023 |

OTHER PUBLICATIONS

U.S. Notice of Allowance dated Aug. 29, 2024 for U.S. Appl. No. 18/487,669; Lee et al.
Search Report and Written Opinion dated Jan. 11, 2024 issued in International Patent Application No. PCT/KR2023/014711.
Search Report and Written Opinion dated Jan. 25, 2024 issued in International Patent Application No. PCT/KR2023/014939.
Extended European Search Report dated Jun. 10, 2025 for EP Application No. 23873166.5.
Extended European Search Report dated Aug. 21, 2025 for EP Application 23873045.1.
NOA (U.S. Appl. No. 18/846,363, dated Feb. 24, 2025).

* cited by examiner

ELECTRONIC DEVICE AND METHOD CONTROLLING SIGNAL PROVIDED TO PROCESSOR

CROSS-REFERENCE TO RELATED APPLICATIONS

This application is a Continuation of U.S. application Ser. No. 18/486,363, filed Oct. 13, 2023, which is the U.S. national phase of International Application No. PCT/KR2023/014939 filed Sep. 26, 2023 which designated the U.S. and claims priority to KR 10-2023-0035417 filed Mar. 17, 2023, KR 10-2023-0016868 filed Feb. 8, 2023, KR 10-2023-0004347 filed Jan. 11, 2023, KR 10-2023-0001471 filed Jan. 4, 2023, KR 10-2022-0125365 filed Sep. 30, 2022, and PCT International Application No. PCT/KR2023/014711, filed on Sep. 25, 2023, the entire contents of each of which are hereby incorporated by reference.

BACKGROUND

Field

The disclosure relates to an electronic device and a method for controlling a signal provided to a processor.

Description of Related Art

An electronic device may include a display panel. For example, the electronic device may include a display driver circuit operably coupled with the display panel. For example, the display driver circuit may display an image obtained from a processor of the electronic device on the display panel.

The above-described information may be provided as a related art for the purpose of helping to understand the present disclosure. No claim or determination is raised as to whether any of the above-described information can be applied as a prior art related to the present disclosure.

SUMMARY

An electronic device is provided. The electronic device may comprise a processor. The electronic device may comprise a display including a display panel and a display driver circuit that includes a memory. The display driver circuit may be configured to identify an event for a display on the display panel. The display driver circuit may be configured to, in response to the event of a first type that executes the display through the memory, change, at a timing before a reference time from a start timing of a scan for the display, a state of a signal provided from the display driver circuit to the processor from a first state indicating enabling an image transmission to the display driver circuit to a second state indicating disabling the image transmission. The display driver circuit may be configured to, in response to the event of a second type that executes the display by bypassing the memory, change, at the start timing, the state of the signal provided from the display driver circuit to the processor from the first state to the second state.

An electronic device is provided. The electronic device may comprise a processor. The electronic device may comprise a display including a display panel and a display driver circuit that includes memory. The display driver circuit may be configured to provide, to the processor, a signal in a second state that indicates disabling an image transmission to the display driver circuit, while displaying an image received from the processor on the display panel. The display driver circuit may be configured to store, in the memory, the image received from the processor. The display driver circuit may be configured to, in response to a completion of a first scan of the image for the display, change a state of the signal from the second state to a first state that indicates enabling the image transmission. The display driver circuit may be configured to change, at a timing before a reference time from a start timing of a second scan of the image stored in the memory, the state from the first state to the second state.

A method is provided. The method may be executed in an electronic device comprising a display including a display panel and a display driver circuit that includes memory. The method may comprise identifying, by the display driver circuit, an event for a display on the display panel. The method may comprise, in response to the event of a first type that executes the display through the memory, changing, the display driver circuit, at a timing before a reference time from a start timing of a scan for the display, a state of a signal provided from the display driver circuit to the processor from a first state indicating enabling an image transmission to the display driver circuit to a second state indicating disabling the image transmission. The method may comprise, in response to the event of a second type that executes the display by bypassing the memory, changing, by the display driver circuit, at the start timing, the state of the signal provided from the display driver circuit to the processor from the first state to the second state.

A method is provided. The method may be executed in an electronic device comprising a display including a display panel and a display driver circuit that includes memory. The method may comprise providing, the display driver circuit, to the processor, a signal in a second state that indicates disabling an image transmission to the display driver circuit, while displaying an image received from the processor on the display panel. The method may comprise storing, by the display driver circuit, in the memory, the image received from the processor. The method may comprise, in response to a completion of a first scan of the image for the display, changing, the display driver circuit, a state of the signal from the second state to a first state that indicates enabling the image transmission. The method may comprise changing, by the display driver circuit, at a timing before a reference time from a start timing of a second scan of the image stored in the memory, the state from the first state to the second state.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

An electronic device may include a processor. The electronic device may include a display including a display driver circuit and a display panel. The display driver circuit may include memory (e.g., graphic random access memory (GRAM)) for at least temporarily storing an image. For example, the memory may be used to store an image received from the processor. For example, the display driver circuit may display the image on the display panel by scanning the image stored in the memory. For example, the scan for the display of the image may not be recognized or identified by the processor. For example, the scan may be unnoticeable (or transparent) to the processor. For example, since the scan is unnoticeable (or transparent) to the processor, the processor may transmit another image next to the image to the display driver circuit while the image stored in the memory is scanned. For example, when the other image is transmitted while the image is scanned, the other image may be displayed together with the image, even though the other image should be displayed after the image is displayed. For example, when the other image is transmitted while the image is scanned, a part of the other image may be displayed on the display panel together with a part of the image. Since the other image should be displayed after the image is displayed, displaying the part of the image and the part of the other image may reduce quality of a service provided through the display.

A signal may be used in the electronic device for the quality of the service. For example, the signal may be referred to as a refresh window (RW) signal (or RW). For example, the signal may be provided to the processor from the display driver circuit to reduce displaying the part of the image and the part of the other image. For example, a state of the signal may be changed to reduce displaying the part of the image and the part of the other image. The electronic device may include components for changing the state of the signal. The components may be illustrated by way of non-limiting example in FIG. 1.

Figure 1:
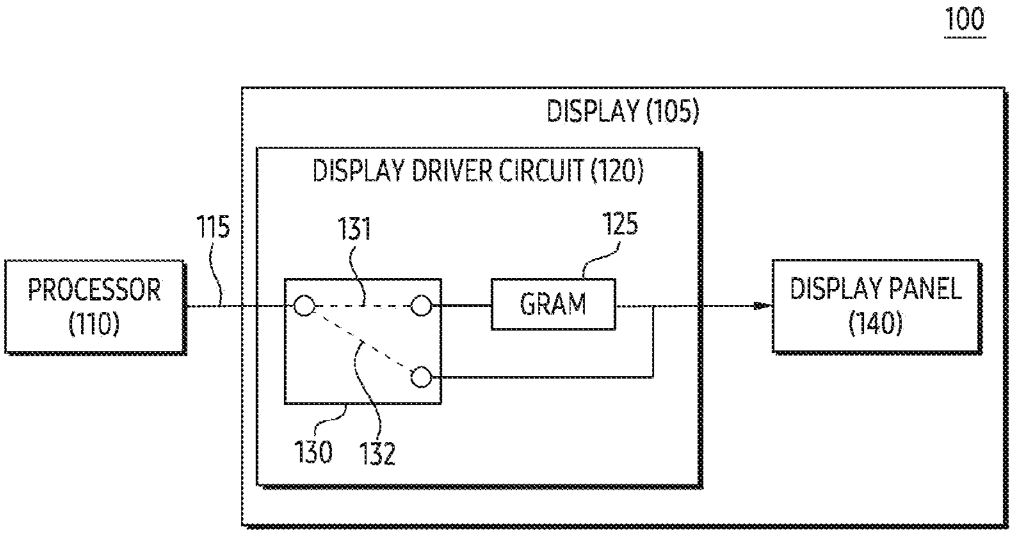
FIG. 1 is a simplified block diagram of an exemplary electronic device.

FIG. 1 is a simplified block diagram of an exemplary electronic device.

Referring to FIG. 1, an electronic device 100 may include a display 105 and a processor (e.g., including processing circuitry) 110.

The display 105 may include a display driver circuit 120 and a display panel 140. For example, the display 105 may include at least a part of a display module 1560 of FIGS. 15 and 16.

Figure 16:
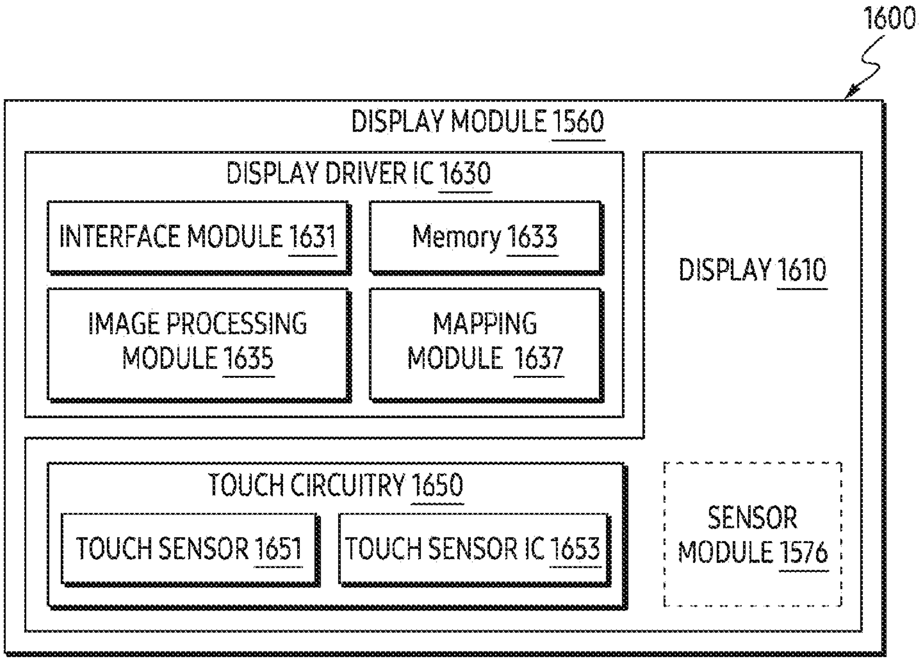
FIG. 16 is a block diagram of a display module according to various embodiments.

For example, the display driver circuit 120 may include at least a part of a DDI 1630 of FIG. 16. For example, the display driver circuit 120 may include a graphic random access memory (GRAM) 125 (e.g., the memory), which may be a volatile memory. For example, the GRAM 125 may include at least a part of memory 1633 of FIG. 16. For example, the display driver circuit 120 may further include a switch 130. For example, the GRAM 125 may be connectable to the processor 110 through the switch 130. For example, the GRAM 125 may be connected to the processor 110 through the switch 130 in a first state 131. For example, the GRAM 125 may be disconnected from the processor 110 through the switch 130 in a second state 132.

Although FIG. 1 illustrates an example in which the switch 130 is included in the display driver circuit 120, the switch 130 may be located outside the display driver circuit 120. However, it is not limited thereto.

For example, the display panel 140 may include at least a part of a display 1610 of FIG. 16. For example, the display panel 140 may include, for example, and without limitation, a low temperature poly-crystalline oxide (LTPO) thin film transistor (TFT) or a low temperature poly-silicon (LTPS) TFT. However, it is not limited thereto. For example, the display panel 140 may be operably coupled to the display driver circuit 120.

Figure 15:
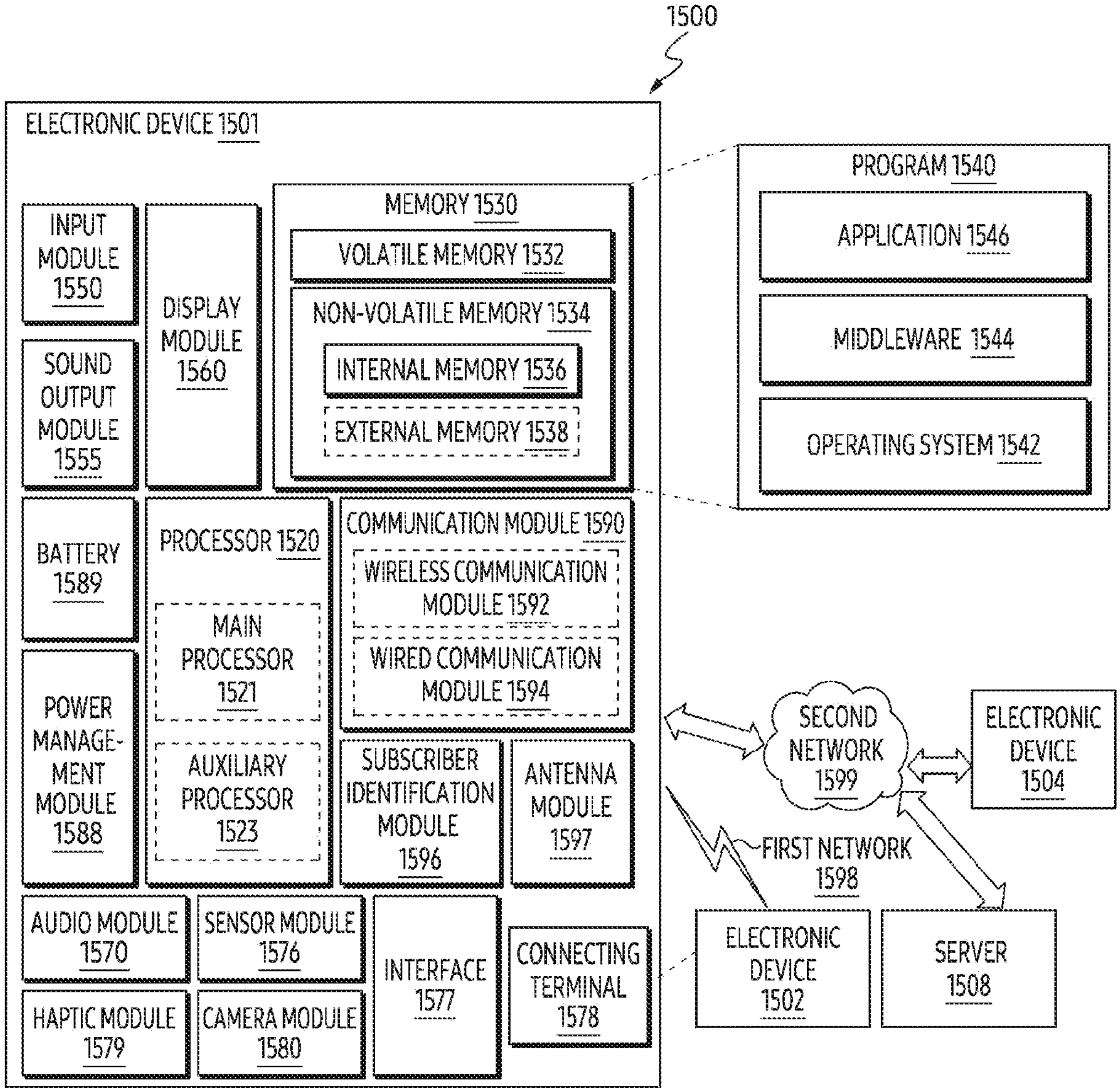
FIG. 15 is a block diagram of an electronic device in a network environment, according to various embodiments.

The processor 110 may include at least a part of a processor 1520 of FIG. 15. For example, the processor 110 may be connected with the display driver circuit 120 through an interface (e.g., including various interface circuitry) 115. For example, the interface 115 may be used to transmit an image from the processor 110 to the display driver circuit 120. For example, the processor 110 may be operably coupled with the display driver circuit 120 through the interface 115. As a non-limiting example, the interface 115 may include a mobile industry processor interface (MIPI).

For example, the processor 110 and the display driver circuit 120 may be configured to execute operations to be illustrated below.

For example, the display driver circuit 120 may provide the signal to the processor 110. The signal provided to the processor 110 from the display driver circuit 120 may indicate a state of the display driver circuit 120 related to an image transmission to the display driver circuit 120. For example, the signal may be in a first state or a second state.

As a non-limiting example, the signal may be provided to the processor 110 based on a refresh rate for the display lower than a reference refresh rate. For example, providing the signal to the processor 110 may be stopped, based on the refresh rate greater than or equal to the reference refresh rate.

The signal may be in a first state indicating enabling the image transmission. The signal may be in the first state indicating to apply the image transmission. For example, the signal in the first state may indicate a display driver circuit 120 in a state capable of receiving an image from the processor 110. For example, the signal in the first state may be different from a tearing effect (TE) signal. For example, the signal in the first state may indicate that the image transmission is available, unlike the TE signal. For example, the signal in the first state may indicate at least one timing capable of executing the image transmission, unlike the TE signal indicating a timing at which an image received from the processor 110 will be stored in the GRAM 125.

The signal may be in a second state indicating disabling the image transmission. The signal may be in the second state indicating to limit the image transmission. For example, the signal in the second state may indicate a display driver circuit 120 in a state of incapable of receiving an image from the processor 110. For example, the signal in the second state may indicate that the image transmission is unavailable. For example, the signal in the second state may be provided to the processor 110 from the display driver circuit 120 while the display driver circuit 120 scans an image for a display on the display panel 140.

For example, the display driver circuit 120 may change the state of the signal from the first state to the second state or from the second state to the first state.

For example, a timing of the change from the first state to the second state may vary according to a type of an event for a display on the display panel 140, identified by the display driver circuit 120. For example, the type of the event may include a first type executing the display through the GRAM 125 and a second type executing the display by bypassing the GRAM 125.

For example, executing the display through the GRAM 125 may include executing the display while the image transmission from the processor 110 to the display driver circuit 120 is stopped. For example, executing the display through the GRAM 125 may include executing the display based on scanning an image stored in the GRAM 125 after completing storing the image from the processor 110 in the GRAM 125. For example, scanning the image stored in the GRAM 125 may be executed to reduce an afterimage caused on the display panel 140. For example, scanning the image stored in the GRAM 125 may be executed to maintain the image on the display panel 140 while a new image is not received from the processor 110. However, it is not limited thereto.

For example, executing the display by bypassing the GRAM 125 may include executing the display while the image transmission from the processor 110 to the display driver circuit 120 is in progress. For example, executing the display by bypassing the GRAM 125 may include executing the display, by bypassing storing an image received from the processor 110 in the GRAM 125 and scanning the image. For example, executing the display by bypassing the GRAM 125 may include executing the display by initiating scanning an image while storing (or before completing storing) the image received from the processor 110 in the GRAM 125. For example, executing the display by bypassing the GRAM 125 may not include executing the display by scanning an image stored in the GRAM 125. For example, executing the display by bypassing the GRAM 125 may include, from among executing the display by bypassing storing an image received from the processor 110 in the GRAM 125 and scanning the image, executing the display based on a scan of an image initiated before completing storing the image received from the processor 110 in the GRAM 125, and executing the display by scanning an image stored in the GRAM 125, executing the display by bypassing storing an image received from the processor 110 in the GRAM 125 and scanning the image and executing the display based on the scan of the image initiated before completing storing the image received from the processor 110 in the GRAM 125.

For example, the display executed in response to the event of the first type may be executed based on scanning an image stored in the GRAM 125. For example, the scan may be executed to display the image displayed on the display panel 140 again while storing the image in the GRAM 125. For example, the event of the first type may be identified based on a control command from the processor 110, a refresh rate for the image, and/or a refresh rate for at least one other image displayed before the image. An operation of identifying the event of the first type will be described in greater detail below with reference to FIG. 4.

For example, the event of the second type may be identified based on a vertical sync start (VSS) packet. For example, the VSS packet may be received from the processor 110 before receiving an image from the processor 110.

For example, the display driver circuit 120 may identify the event, change the state of the signal from the first state to the second state in response to the event of the first type at a timing before a reference time from a start timing of a scan for the display, and change the state from the first state to the second state in response to the event of the second type at the start timing. A timing of the change from the first state to the second state executed in response to the event of the first type and a timing of the change from the first state to the second state executed in response to the event of the second type may be illustrated below with reference to FIGS. 2, 3, 5, and 6.

Figure 2:
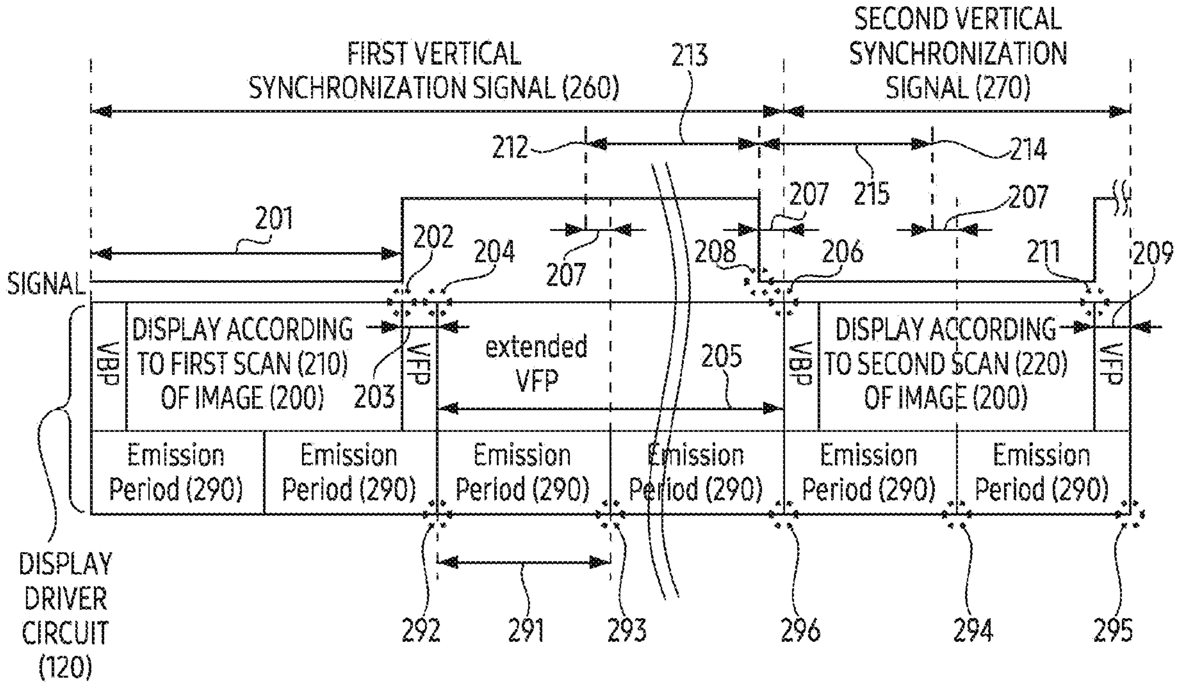
FIGS. 2 and 3 illustrate an exemplary method of changing a state of a signal provided to a processor from a display driver circuit, before a start timing of a scan.
Figure 3:
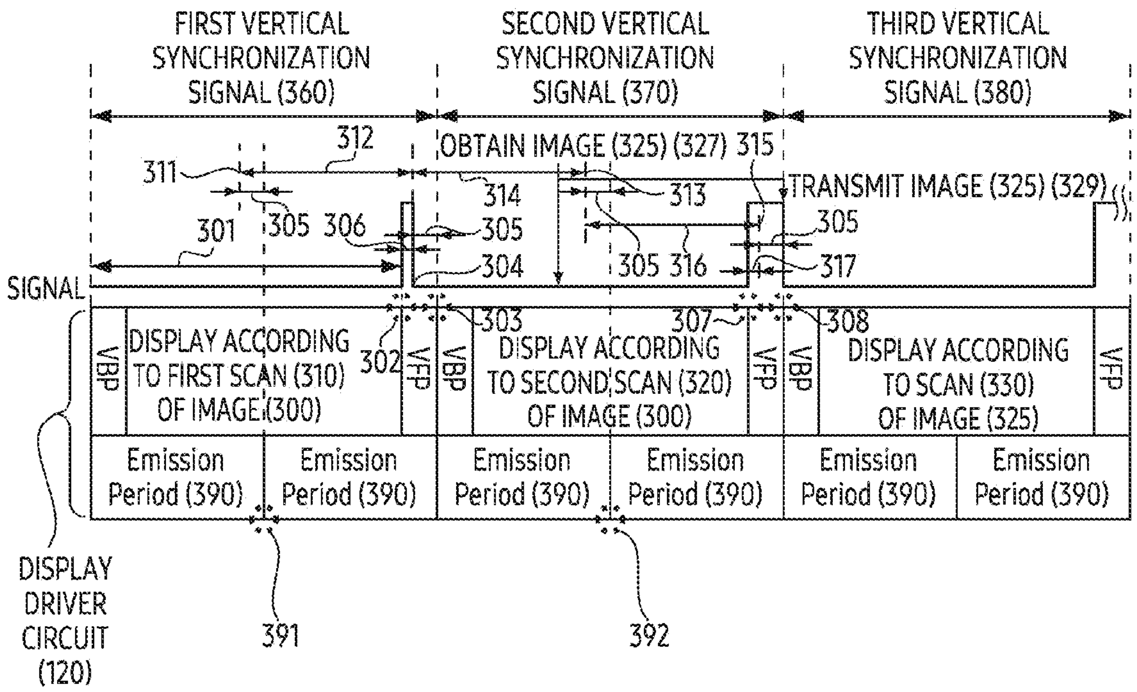

FIGS. 2 and 3 illustrate an exemplary method of changing a state of a signal provided to a processor from a display driver circuit, before a start timing of a scan.

Referring to FIG. 2, the display driver circuit 120 may provide the signal in the second state to the processor 110 while displaying an image 200 on the display panel 140 according to a first scan 210 of the image 200 received from the processor 110, such as a time interval (or time period) 201. For example, the time interval 201 may include a back porch interval (e.g., a vertical back porch (VBP)) of a first vertical synchronization signal 260 and an active interval (e.g., an interval corresponding to a display according to the first scan 210 of the image 200) of the first vertical synchronization signal 260.

For example, displaying the image 200 on the display panel 140 based on the first scan 210 of the image 200 may be executed in response to the event of the second type. For example, the display driver circuit 120 may identify the event of the second type, based on the VSS packet received from the processor 110 before the image 200.

For example, the display driver circuit 120 may store the image 200 received from the processor 110 in the GRAM 125. For example, storing the image 200 in the GRAM 125 may be executed while the first scan 210 of the image 200 is being executed. For example, storing the image 200 in the GRAM 125 may be executed for a display according to the event of the first type. For example, the image 200 is stored in the GRAM 125, but the display according to the first scan 210 of the image 200 may be executed by bypassing the GRAM 125.

For example, the display driver circuit 120 may change the state of the signal from the second state to the first state, in response to a completion of the first scan 210 of the image 200 for the display. For example, the display driver circuit 120 may change the state from the second state to the first state, at a timing 202 (or a start timing 202 of a front porch interval 203) between the active interval of the first vertical synchronization signal 260 and a front porch interval (e.g., a vertical front porch (VFP)) 203 of the first vertical synchronization signal 260.

For example, the display driver circuit 120 may extend the front porch interval of the first vertical synchronization signal 260 from an end timing 204 of the front porch interval 203 of the first vertical synchronization signal 260, based on identifying that an image (e.g., a new image) next to the image 200 is not received from the processor 110. For example, the display driver circuit 120 may obtain an extended front porch interval (e.g., an extended VFP) 205 of the first vertical synchronization signal 260. For example, a length of the extended front porch interval 205 of the first vertical synchronization signal 260 may be identified based on a length 291 of an emission period (or emission interval) 290. For example, a length of the extended front porch interval 205 of the first vertical synchronization signal 260 may be a multiple of a length 291 of the emission period 290. For example, since the image transmission from the processor 110 to the display driver circuit 120 may be started at a start timing (e.g., a timing 292 or a timing 293) of the emission period 290, the length of the extended front porch interval 205 of the first vertical synchronization signal 260 may be a multiple of the length 291 of the emission period 290. However, it is not limited thereto.

For example, the display driver circuit 120 may identify the event of the first type, before an end timing 206 of the extended front porch interval 205 (or an end timing 206 of the first vertical synchronization signal 260). For example, identifying the event of the first type may be illustrated by way of non-limiting example with reference to FIG. 4.

Figure 4:
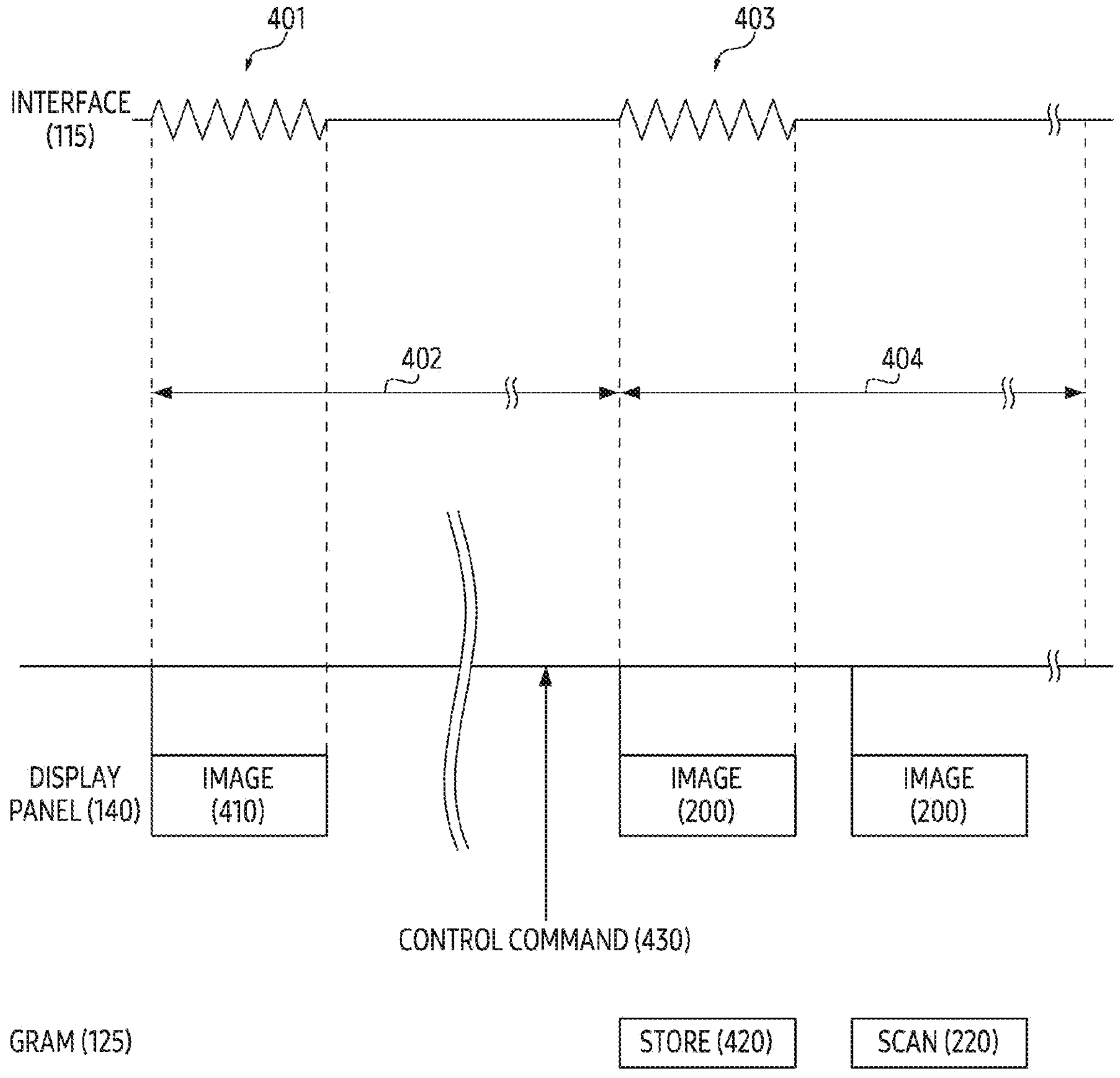
FIG. 4 illustrates an exemplary method of identifying an event of a first type.

FIG. 4 illustrates an exemplary method of identifying a first type of an event.

Referring to FIG. 4, a display driver circuit 120 may display an image 410 on a display panel 140 based on receiving the image 410 before an image 200 from a processor 110 through an interface 115, such as a state 401. For example, the image 410 may be maintained on the display panel 140 for a time length 402. For example, the time length 402 may correspond to a refresh rate for the image 410. For example, the refresh rate for the image 410 may correspond to a time length when the image 410 is maintained on the display panel 140. For example, the refresh rate for the image 410 may correspond to a time length when the image 410 is changed to the image 200. For example, the refresh rate for the image 410 may correspond to a time length between a start timing of a display of the image 410 and a start timing of a display of the image 200. However, it is not limited thereto.

For example, after the image 410 is displayed, the display driver circuit 120 may receive the image 200 from the processor 110 through the interface 115, such as a state 403. As illustrated in FIG. 2, the display driver circuit 120 may display the image 200 received from the processor 110 through the interface 115 on the display panel 140 and execute storing 420 of the image 200 received from the processor 110 through the interface 115 in the GRAM 125. For example, the display may be executed based on a first scan 210 of the image 200. For example, the display may be executed in response to the event of the second type identified based on the VSS packet received from the processor 110 before the image 200. For example, storing 420 of the image 200 may be executed, based on a control command 430 (e.g. still indication (sticky flag indication) and/or on-the-fly indication) indicating to enable the GRAM 125 or store the image 200 in the GRAM 125. However, it is not limited thereto.

For example, the display driver circuit 120 may display the image 200 on the display panel 140 again based on a second scan 220 of the image 200 in the GRAM 125. For example, the display driver circuit 120 may execute the second scan 220 of the image 200, in response to the event of the first type. For example, the event of the first type may be identified based on the refresh rate (e.g., the time length 402) for the image 410. For example, the event of the first type may be identified based on the control command 430. For example, the event of the first type may be identified based on a refresh rate (e.g., a time length 404) for the image 200. The refresh rate for the image 200 may indicate a refresh rate identified or targeted by the processor 110 when obtaining or rendering the image 200. For example, the refresh rate for the image 200 may be indicated through the control command 430. However, it is not limited thereto.

Referring back to FIG. 2, in response to the event of the first type, the display driver circuit 120 may change the state from the first state to the second state, at a timing before a reference time from the end timing 206 of the extended front porch interval 205 (or an end timing 206 of a first vertical synchronization signal 260 (or a start timing 206 of a second vertical synchronization signal 270)). For example, the end timing 206 of the extended front porch interval 205 may be a start timing 206 of the second scan 220 of the image 200 (the start timing 206 of the second vertical synchronization signal 270).

For example, a reference time 207 may be a time to reduce executing the image transmission from the processor 110 to the display driver circuit 120, while the second scan 220 of the image 200 to be illustrated below is being executed. For example, even when an image is obtained during the reference time 207 from a timing 208 (or during the start timing 206 (or a timing 296) of the second vertical synchronization signal 270 from the timing 208), the processor 110 may defer (or delay, put off, disable, or refrain from) transmitting the image at the start timing 206 of the second vertical synchronization signal 270 and identify whether the image may be transmitted, at a timing 294, which is a timing of an image transmission next to the start timing 206 (or the timing 296) of the second vertical synchronization signal 270.

For example, since the second scan 220 of the image 200 is unnoticeable (or transparent) to the processor 110, the display driver circuit 120 may change the state from the first state to the second state, at the timing 208 before the reference time 207 from a timing (e.g., the start timing 206 of the second vertical synchronization signal 270 or the start timing 206 of the second scan 220 of the image 200) that is capable of starting the image transmission. For example, the timing 208 may be within the extended front porch interval 205. Unlike illustrated in FIG. 1, when the front porch interval of the first vertical synchronization signal 260 is not extended, the timing 208 may be within the front porch interval (e.g., the front porch interval 203).

For example, the display driver circuit 120 may change the state of the signal from the second state to the first state, in response to a completion of the second scan 220 of the image 200. For example, the display driver circuit 120 may change the state from the second state to the first state, at a timing 211 (or a start timing 211 of a front porch interval 209) between an active interval (e.g., an interval corresponding to a display according to the second scan 220 of the image 200) of the second vertical synchronization signal 270 and the front porch interval (e.g., the VFP) 209 of the second vertical synchronization signal 270.

On the other hand, the processor 110 may execute the image transmission based on identifying the state of the signal. For example, the processor 110 may execute the image transmission based on the signal in the first state and defer executing the image transmission based on the signal in the second state.

For example, the processor 110 may execute the image transmission in response to a start timing of a synchronization signal for the image transmission, based on the signal in the first state provided from the display driver circuit 120. The synchronization signal may include a vertical synchronization signal (e.g., the first vertical synchronization signal 260 and/or the second vertical synchronization signal 270). The synchronization signal may include an emission synchronization signal indicating a timing (or start timing) of the emission period 290. For example, the processor 110 may execute the image transmission in response to a timing 292 (or a timing 204) or a timing 293, while the signal in the first state is provided.

For example, the processor 110 may defer the image transmission based on the signal in the second state provided from the display driver circuit 120. Although not illustrated in FIG. 2, while the signal in the second state is provided, the processor 110 may obtain an image distinct from the image 200 and defer transmitting the image to the display driver circuit 120. Although not illustrated in FIG. 2, in response to the signal in the first state changed from the second state, the processor 110 may transmit the image to the display driver circuit 120 at the start timing of the synchronization signal. For example, the start timing of the synchronization signal may be a timing 295, which is an end timing (or a start timing of a third vertical synchronization signal next to the second vertical synchronization signal 270) of the second vertical synchronization signal 270 or a start timing of an emission synchronization signal.

For example, the processor 110 may identify whether to execute the image transmission at the timing 296 that is a timing capable of executing the image transmission, based on the state of the signal provided from the display driver circuit 120 to the processor 110, in a time interval 213 from the timing 212 before the reference time 207 from the timing 293 that is a timing capable of executing the image transmission to the timing 208. For example, the processor 110 may identify that the image transmission at the timing 296 is applied, in response to the first state of the signal provided to the processor 110 from the display driver circuit 120 within the time interval 213. For example, unlike illustrated in FIG. 2, the processor 110 may also execute the image transmission, in response to the first state of the signal provided to the processor 110 from the display driver circuit 120 within the time interval 213. When the image transmission is executed at the timing 296, the display driver circuit 120 may refrain from executing for the display according to the second scan 220 of the image 200 illustrated in FIG. 2, and may execute the display according to the image transmission from the timing 296.

For example, the processor 110 may identify whether to execute the image transmission at the timing 294 that is a timing capable of executing the image transmission, based on the state of the signal provided from the display driver circuit 120 to the processor 110, in a time interval 215 from the timing 208 to a timing 214 before a reference time 207 from the timing 294 that is a timing capable of executing the image transmission. For example, the processor 110 may identify that the image transmission at the timing 294 is restricted, in response to the second state of the signal provided to the processor 110 from the display driver circuit 120 within the time interval 215. For example, even when the processor 110 obtains another image distinct from the image 200 before the timing 294, the processor 110 may refrain from executing the image transmission for a display of the other image on the display panel 140 from the timing 294, based on the identification.

For example, referring to FIG. 3, the display driver circuit 120 may provide the signal in the second state to the processor 110 like the time interval 301, while displaying an image 300 on the display panel 140 based on a first scan 310 of the image 300 received from the processor 110. For example, the time interval 301 may include a back porch interval (e.g., the VBP) of a first vertical synchronization signal 360 and an active interval (e.g., an interval corresponding to a display according to the first scan 310 of the image 300) of the first vertical synchronization signal 360.

For example, displaying the image 300 on the display panel 140 based on the first scan 310 of the image 300 may be executed in response to the event of the second type. For example, the display driver circuit 120 may identify the event of the second type, based on the VSS packet received from the processor 110 before the image 300.

For example, the display driver circuit 120 may store the image 300 received from the processor 110 in the GRAM 125. For example, storing the image 300 in the GRAM 125 may be executed while the first scan 310 of the image 300 is being executed. For example, storing the image 300 in the GRAM 125 may be executed for a display according to the event of the first type. For example, the image 300 is stored in the GRAM 125, but the display according to the first scan 310 of the image 300 may be executed by bypassing the GRAM 125.

For example, the display driver circuit 120 may change the state of the signal from the second state to the first state, in response to a completion of the first scan 310 of the image 300 for the display. For example, the display driver circuit 120 may change the state of the signal from the second state to the first state, at a timing 302, which is an end timing of the active interval of the first vertical synchronization signal 360.

For example, the processor 110 may identify whether to execute the image transmission for a display of an image (e.g., a new image) next to the image 300. For example, the processor 110 may identify whether to execute the image transmission at a timing 303 that is a timing capable of executing the image transmission, based on the state of the signal provided to the processor 110 from the display driver circuit 120 within a time interval 312 from a timing 311 to a timing 304. The timing 311 may be a timing before a reference time 305 (e.g., the reference time 207) from a timing 391 (e.g., a start timing of an emission period 390) capable of executing the image transmission. The timing 304 may be a timing before the reference time 305 from the timing 303 capable of executing the image transmission. For example, the processor 110 may identify that the image transmission from the timing 303 is applied, based on identifying that the signal provided to the processor 110 from the display driver circuit 120 within the time interval 312 is in the first state within the time interval 306. For example, although the image transmission from the timing 303 is applied, the processor 110 may not execute the image transmission from the timing 303, based on identifying that a new image distinct from the image 300 is not present.

For example, the display driver circuit 120 may identify the event of the first type. For example, the display driver circuit 120 may change the state from the first state to the second state, at the timing 304 before the reference time 305 from the timing 303, in response to the event of the first type. For example, the event of the first type may be identified through at least a part of operations illustrated in FIG. 4. For example, the display driver circuit 120 may change the state from the first state to the second state at the timing 304, to reduce executing the image transmission from the processor 110 at a timing 392 while the second scan 320 of the image 300 stored in the GRAM 125 is being executed. For example, the processor 110 may refrain from executing the image transmission from the timing 392, based on identifying that the state of the signal is maintained in the second state within the time interval 314 from the timing 304 to a timing 313. The timing 313 may be a timing before the reference time 305 from the timing 392.

For example, the display driver circuit 120 may execute the display of the image 300 according to the second scan 320 of the image 300 within an active interval of the second vertical synchronization signal 370.

On the other hand, the processor 110 may execute obtaining 327 of the image 325 while the second scan 320 of the image 300 is being executed. Since the state of the signal is maintained in the second state within the time interval 314, the processor 110 may defer or bypass a transmission 329 of the image 325 at the timing 392.

For example, the display driver circuit 120 may change the state from the second state to the first state in response to a completion of the second scan 320 of the image 300. For example, the display driver circuit 120 may change the state from the second state to the first state, at the timing 307. For example, the display driver circuit 120 may maintain the first state changed from the second state at the timing 307, based on identifying that the event of the first type is not present.

On the other hand, the processor 110 may identify the state of the signal within a time interval 316 from the timing 313 to a timing 315, in order to execute the transmission 329 of the image 325 from the timing 308. The timing 315 may be a timing before the reference time 305 from the timing 308. For example, the processor 110 may execute the transmission 329 of the image 325 from the timing 308, based on identifying that the signal provided to the processor 110 from the display driver circuit 120 within the time interval 316 is in the first state within a time interval 317.

For example, the display driver circuit 120 may change the state from the first state to the second state at the timing 308, based on the image 325 received from the processor 110 at the timing 308. For example, the display driver circuit 120 may provide the signal in the second state to the processor 110, while displaying the image 325 on the display panel 140 based on executing the scan 330 of the image 325 received from the processor 110 according to a third vertical synchronization signal 380.

As illustrated in FIGS. 2 and 3, a change of the state of the signal may be executed for a display executed in response to the event of the first type or may be executed a display executed in response to the event of the second type. Executing a change of the state of the signal for a display executed in response to the event of the second type may be further illustrated by way of non-limiting example below with reference to FIGS. 5 and 6.

Figure 5:
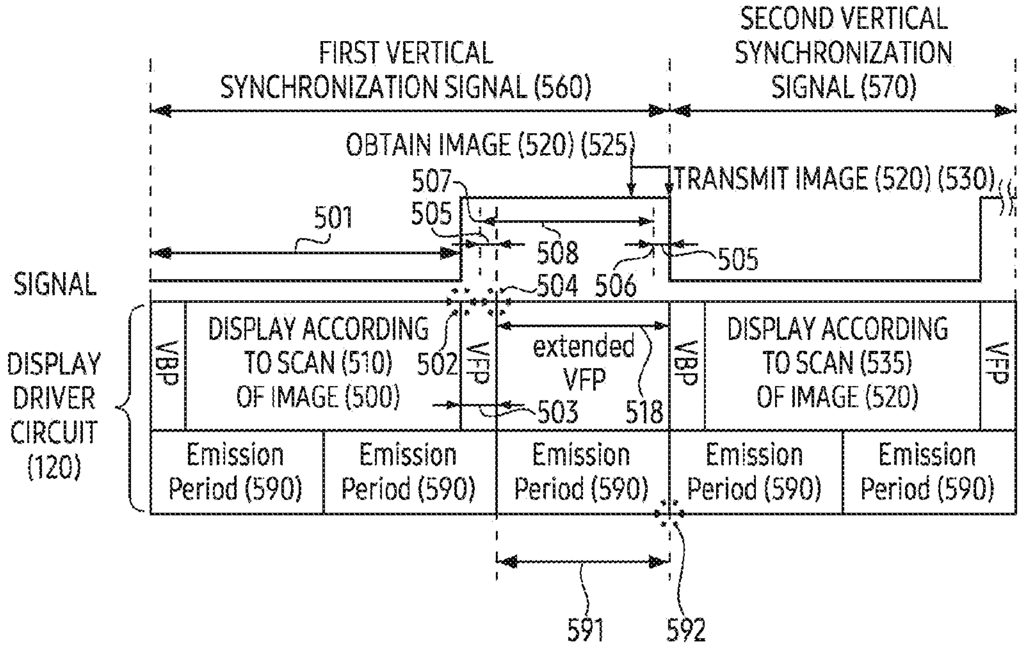
FIG. 5 illustrates an exemplary method of changing a state of a signal provided to a processor from a display driver circuit, at a start timing of a scan.

FIG. 5 illustrates an exemplary method of changing a state of a signal provided to a processor from a display driver circuit, at a start timing of a scan.

Figure 6:
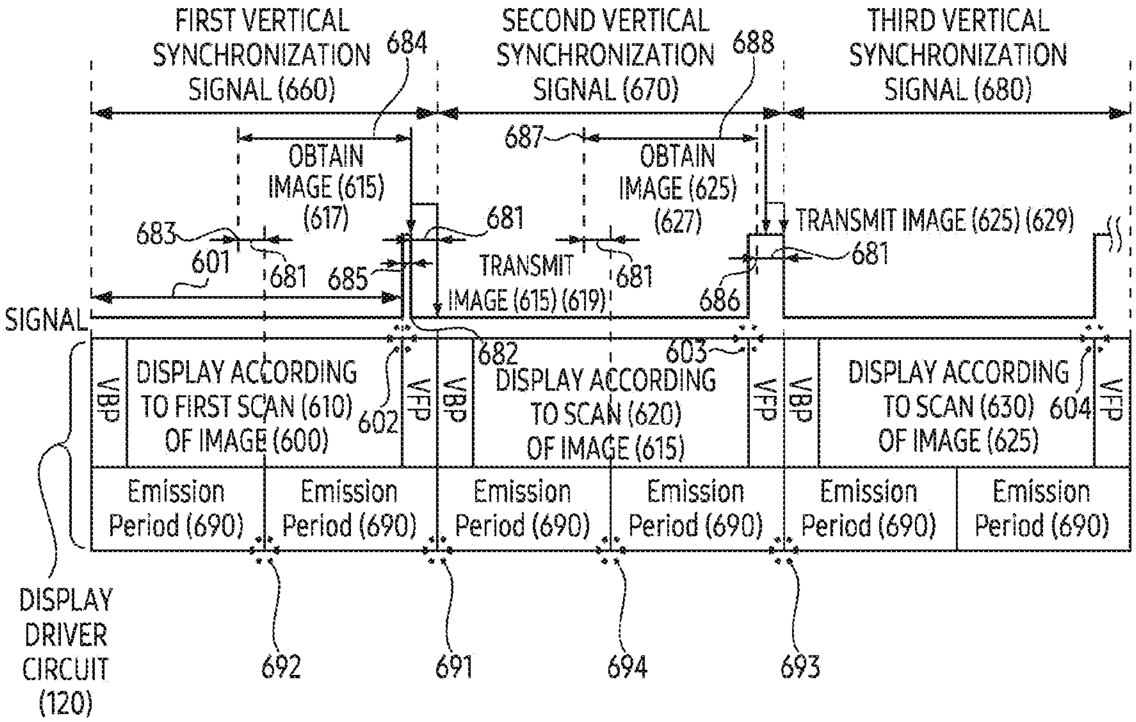
FIG. 6 illustrates an exemplary method of refraining from executing a display through graphic random access memory (GRAM) after changing a state of a signal provided to a processor from a display driver circuit before a start timing of a scan.

FIG. 6 illustrates an exemplary method of refraining from executing a display through graphic random access memory (GRAM) after changing a state of a signal provided to a processor from a display driver circuit before a start timing of a scan.

Referring to FIG. 5, as illustrated in FIG. 2, the processor 110 may identify whether the state of the signal provided to the processor 110 from the display driver circuit 120 is the first state or the second state. For example, the display driver circuit 120 may provide the signal in the second state to the processor 110 like a time interval 501, while a scan 510 of an image 500 received from the processor 110 is executed to display the image 500 on the display panel 140. For example, the time interval 501 may include a back porch interval (e.g., the VBP) of a first vertical synchronization signal 560 and an active interval (e.g., an interval corresponding to a display according to the scan 510 of the image 500) of the first vertical synchronization signal 560.

For example, displaying the image 500 on the display panel 140 based on the scan 510 of the image 500 may be executed in response to the event of the second type. For example, the display driver circuit 120 may identify the event of the second type, based on the VSS packet received from the processor 110 before the image 500.

For example, the display driver circuit 120 may change the state of the signal from the second state to the first state, in response to a completion of the scan 510 of the image 500 for the display. For example, the display driver circuit 120 may change the state from the second state to the first state, at a timing 502 (or a starting timing 502 of a front porch interval 503) between the active interval of the first vertical synchronization signal 560 and the front porch interval (e.g., the VFP) 503 of the first vertical synchronization signal 560. For example, the display driver circuit 120 may maintain the state to the first state changed from the second state at the timing 502, based on identifying that the event of the first type is not present.

For example, the display driver circuit 120 may extend a front porch interval of the first vertical synchronization signal 560, based on identifying that an image (e.g., a new image) next to the image 500 is not received from the processor 110, at a timing 504, which is an end timing of the front porch interval 503 of the first vertical synchronization signal 560. For example, the display driver circuit 120 may obtain an extended front porch interval (e.g., the extended VFP) 518 of the first vertical synchronization signal 560. For example, a length of the extended front porch interval 518 of the first vertical synchronization signal 560 may be identified based on a length 591 of an emission period 590. For example, the length of the extended front porch interval 518 of the first vertical synchronization signal 560 may be a multiple of the length 591 of the emission period 590. For example, the length of the extended front porch interval 518 of the first vertical synchronization signal 560 may be a multiple of the length 591 of the emission period 590, for the image transmission from the processor 110 to the display driver circuit 120, which may be started at a start timing (e.g., a timing 592) of the emission period 590. However, it is not limited thereto.

On the other hand, the processor 110 may execute obtaining 525 of an image 520 within the extended front porch interval 518 of the first vertical synchronization signal 560. For example, the processor 110 may identify the state of the signal within a time interval 508 from a timing 507 to a timing 506, to execute transmitting 530 the image 520 at the timing 592, based on obtaining 525 of the image 520. The timing 506 may be a timing before a reference time 505 from the timing 592. For example, the processor 110 may execute transmitting 530 the image 520 at the timing 592, based on identifying that the time interval 508 includes a timing when the state of the signal is the first state.

For example, the display driver circuit 120 may change the state from the first state to the second state at the timing 592, in response to the image 520 received from the processor 110 at the timing 592. For example, the display driver circuit 120 may provide the signal in the second state to the processor 110, while executing a scan 535 of the image 520 received from the processor 110 according to a second vertical synchronization signal 570 to display the image 520 on the display panel 140.

Referring to FIG. 6, the display driver circuit 120 may provide the signal in the second state to the processor 110 like a time interval 601, while displaying an image 600 on the display panel 140 based on a first scan 610 of the image 600 received from the processor 110. For example, the time interval 601 may include a back porch interval (e.g., the VBP) of a first vertical synchronization signal 660 and an active interval (e.g., an interval corresponding to a display according to the scan 610 of the image 600) of the first vertical synchronization signal 660.

For example, displaying the image 600 on the display panel 140 based on the scan 610 of the image 600 may be executed in response to the event of the second type. For example, the display driver circuit 120 may identify the event of the second type, based on the VSS packet received from the processor 110 before the image 600.

Although not illustrated in FIG. 6, the display driver circuit 120 may store the image 600 received from the processor 110 in the GRAM 125. For example, storing the image 600 in the GRAM 125 may be executed while the first scan 610 of the image 600 is executed. For example, storing the image 600 in the GRAM 125 may be executed for a display according to the event of the first type. For example, the image 600 is stored in the GRAM 125, but the display according to the first scan 610 of the image 600 may be executed by bypassing the GRAM 125. For example, the display driver circuit 120 may change the state of the signal from the second state to the first state, in response to a completion of the first scan 610 of the image 600. The change from the second state to the first state may be executed at the timing 602.

For example, the display driver circuit 120 may identify the event of the first type before a timing 691. For example, the display driver circuit 120 may change the state from the first state to the second state in response to the event of the first type, at a timing 682 before a reference time 681 (e.g., the reference time 207, the reference time 305, and/or the reference time 505) from the timing 691. For example, since a second scan (not illustrated in FIG. 6) of the image 600 is unnoticeable (or transparent) to the processor 110, the display driver circuit 120 may change the state from the first state to the second state, at the timing 682 before the reference time 681 from timing the 691 (e.g., a start timing of an emission period 690). For example, the timing 682 may be within a front porch interval (VFP) of the first vertical synchronization signal 660.

On the other hand, the processor 110 may execute obtaining 617 of the image 615. The processor 110 may identify whether transmitting 619 the image 615 may be executed at the timing 691, based on the state of the signal within a time interval 684 from a timing 683 to the timing 682. The timing 683 may be a timing before the reference time 681 from a timing 692 (e.g., the start timing of the emission period 690). For example, the processor 110 may execute transmitting 619 the image 615 at the timing 691, based on identifying that the state of the signal provided to the processor 110 from the display driver circuit 120 within the time interval 684 is the first state within a time interval 685.

On the other hand, the display driver circuit 120 may refrain from (or cancel) executing the second scan of the image 600 scheduled based on the timing 691, in response to the image 615 received from the processor 110 at the timing 691. The display driver circuit 120 may execute a scan 620 of the image 615 instead of the second scan of the image 600.

For example, the display driver circuit 120 may display the image 615 on the display panel 140, based on the scan 620 of the image 615 received from the processor 110. For example, displaying the image 615 on the display panel 140 based on the scan 620 of the image 615 may be executed in response to the event of the second type. For example, the display driver circuit 120 may identify the event of the second type, based on the VSS packet received from the processor 110 before the image 615.

For example, the display driver circuit 120 may change the state of the signal from the second state to the first state, in response to a completion of the scan 620 of the image 615 for the display. For example, the display driver circuit 120 may change the state of the signal from the second state to the first state, at a timing 603, which is an end timing of an active interval of a second vertical synchronization signal 670. For example, the display driver circuit 120 may maintain the state to the first state changed from the second state at the timing 603, based on identifying that the event of the first type is not present.

On the other hand, the processor 110 may execute obtaining 627 of an image 625. For example, the processor 110 may identify whether transmitting 629 of the image 625 may be executed at a timing 693 (e.g., the start timing of the emission period 690), based on the state of the signal within a time interval 688 from a timing 687 to a timing 686. The timing 686 may be a timing before the reference time 681 from the timing 693. The timing 687 may be a timing before the reference time 681 from a timing 694 (e.g., the start timing of the emission period 690). For example, the processor 110 may execute transmitting 629 of the image 625 at the timing 693, based on identifying the time interval 688 including a time interval in which the signal is within the first state.

For example, the display driver circuit 120 may display the image 625 on the display panel 140, based on a scan 630 of the image 625 received from the processor 110. For example, displaying the image 625 on the display panel 140 based on the scan 630 of the image 625 may be executed in response to the event of the second type. For example, the display driver circuit 120 may identify the event of the second type, based on the VSS packet received from the processor 110 before the image 625.

For example, the display driver circuit 120 may change the state of the signal from the second state to the first state, in response to a completion of the scan 630 of the image 625 for the display. For example, the display driver circuit 120 may change the state of the signal from the second state to the first state, at a timing 604, which is an end timing of an active interval of a third vertical synchronization signal 680.

Referring back to FIG. 1, the processor 110 and the display driver circuit 120 may execute operations illustrated through FIG. 2 and FIG. 5. The operations will be illustrated by way of non-limiting example below with reference to FIG. 7.

Figure 7:
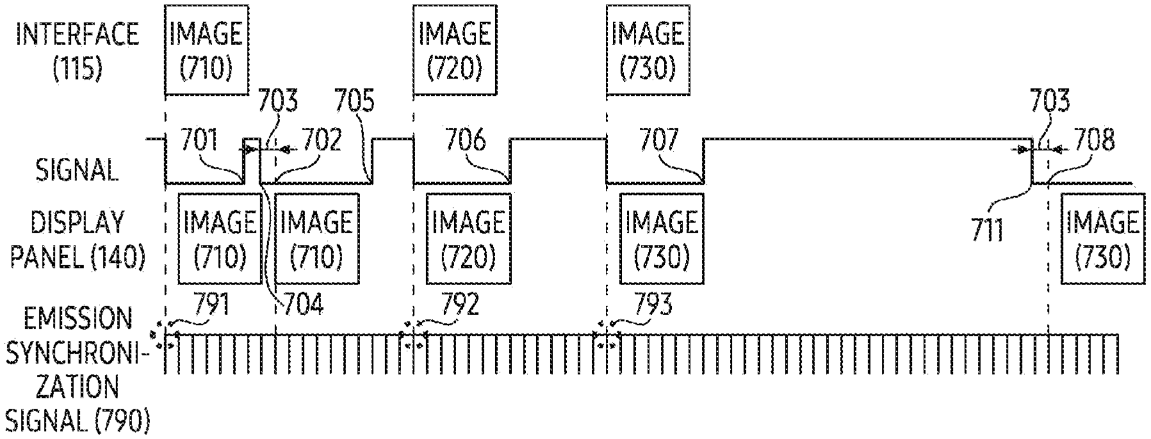
FIG. 7 illustrates an example of an image transmission to a display driver circuit executed based on identifying a state of a signal.

FIG. 7 illustrates an example of an image transmission to a display driver circuit executed based on identifying a state of a signal.

Referring to FIG. 7, the processor 110 may identify whether the state of the signal provided to the processor 110 from the display driver circuit 120 is the first state or the second state.

For example, the processor 110 may transmit an image 710 to the display driver circuit 120 through the interface 115 based on a timing 791 of an emission synchronization signal 790, in response to the signal in the first state. For example, the display driver circuit 120 may change the state from the first state to the second state, in response to the image 710 received from the processor 110 based on the timing 791.

For example, the display driver circuit 120 may provide the signal in the second state to the processor 110, while displaying the image 710 on the display panel 140 based on a first scan of the image 710 received based on the timing 791. For example, displaying the image 710 based on the first scan of the image 710 may be executed in response to the event of the second type. For example, the display driver circuit 120 may identify the event of the second type, based on the VSS packet received from the processor 110 before the image 710.

Although not illustrated in FIG. 7, the display driver circuit 120 may store the image 710 received from the processor 110 in the GRAM 125. For example, storing the image 710 in the GRAM 125 may be executed at least partially within at least a part of a time interval at which the first scan of the image 710 is executed. For example, storing the image 710 in the GRAM 125 may be executed for the display according to the event of the first type. For example, the image 710 is stored in the GRAM 125, but the display according to the first scan of the image 710 may be executed by bypassing the GRAM 125.

For example, the display driver circuit 120 may change the state of the signal from the second state to the first state in response to a completion of the first scan of the image 710. For example, the display driver circuit 120 may change the state from the second state to the first state at the timing 701.

For example, the display driver circuit 120 may identify the event of the first type, while the signal in the first state is provided to the processor 110. For example, the event of the first type may be identified through at least a part of operations illustrated with reference to FIG. 4.

For example, the display driver circuit 120 may change the state from the first state to the second state in response to the event of the first type. For example, the change from the first state to the second state may be executed at a timing 704 before a reference time 703 (e.g., the reference time 207, the reference time 305, the reference time 505, and/or the reference time 681) from a timing 702, which is a start timing of a second scan of the image 710 stored in the GRAM 125. For example, since the second scan of image 710 is unnoticeable (or transparent) to the processor 110, the display driver circuit 120 may change the state from the first state to the second state, at the timing 704 before the reference time 703 from the timing 702 (e.g., a timing of the emission synchronization signal 790) capable of initiating the image transmission. For example, the timing 704 may be within a front porch interval of a vertical synchronization signal or an extended front porch interval. For example, the processor 110 may recognize an interval in which a state of the display driver circuit 120 is a state of incapable of receiving an image, based on a time interval in which the signal is in the second state.

For example, the display driver circuit 120 may maintain the state of the signal in the second state, while the second scan of the image 710 in the GRAM 125 is executed.

For example, the display driver circuit 120 may change the state of the signal from the second state to the first state, in response to a completion of the second scan of the image 710 in the GRAM 125. For example, the display driver circuit 120 may change the state from the second state to the first state, at the timing 705. For example, the processor 110 may recognize an interval in which a state of the display driver circuit 120 is a state capable of receiving an image, based on a time interval in which the signal is in the first state.

For example, the processor 110 may transmit an image 720 to the display driver circuit 120 through the interface 115 based on a timing 792 of the emission synchronization signal 790, in response to the signal in the first state. For example, the display driver circuit 120 may change the state of the signal from the first state to the second state, in response to the image 720 received from the processor 110 based on the timing 792.

For example, the display driver circuit 120 may provide the signal in the second state to the processor 110, while displaying the image 720 on the display panel 140 based on a scan of the image 720 received based on the timing 792. For example, displaying the image 720 based on the scan of the image 720 may be executed in response to the event of the second type. For example, the display driver circuit 120 may identify the event of the second type, based on the VSS packet received from the processor 110 before the image 720.

For example, the display driver circuit 120 may change the state of the signal from the second state to the first state, in response to a completion of the scan of the image 720. For example, the display driver circuit 120 may change the state from the second state to the first state at a timing 706.

For example, the processor 110 may transmit an image 730 to the display driver circuit 120 through the interface 115, based on a timing 793 of the emission synchronization signal 790 in response to the signal in the first state. For example, the display driver circuit 120 may change the state of the signal from the first state to the second state, in response to the image 730 received from the processor 110 based on the timing 793.

For example, the display driver circuit 120 may provide the signal in the second state to the processor 110, while displaying the image 730 on the display panel 140 based on a first scan of the image 730 received based on the timing 793. For example, displaying the image 730 based on the first scan of the image 730 may be executed in response to the event of the second type. For example, the display driver circuit 120 may identify the event of the second type, based on the VSS packet received from the processor 110 before the image 730.

Although not illustrated in FIG. 7, the display driver circuit 120 may store the image 730 received from the processor 110 in the GRAM 125. For example, storing the image 730 in the GRAM 125 may be executed at least partially within at least a part of a time interval at which the first scan of the image 730 is executed. For example, storing the image 730 in the GRAM 125 may be executed for the display according to the event of the first type. For example, the image 730 is stored in the GRAM 125, but the display according to the first scan of the image 730 may be executed by bypassing the GRAM 125.

For example, the display driver circuit 120 may change the state of the signal from the second state to the first state, in response to a completion of the first scan of the image 730. For example, the display driver circuit 120 may change the state from the second state to the first state, at a timing 707.

For example, the display driver circuit 120 may identify the event of the first type, while the signal in the first state is provided to the processor 110. For example, the event of the first type may be identified through at least a part of operations illustrated with reference to FIG. 4.

For example, the display driver circuit 120 may change the state from the first state to the second state in response to the event of the first type. For example, the change from the first state to the second state may be executed, at a timing 711 before the reference time 703 from a timing 708, which is a start timing of a second scan of the image 730 stored in the GRAM 125. For example, since the second scan of image 730 is unnoticeable (or transparent) to the processor 110, the display driver circuit 120 may change the state from the first state to the second state, at the timing 711 before the reference time 703 from the timing 708 (e.g., a timing of the emission synchronization signal 790) capable of initiating the image transmission. For example, the timing 711 may be within a front porch interval of a vertical synchronization signal or an extended front porch interval. For example, the processor 110 may recognize an interval in which a state of the display driver circuit 120 is a state of incapable of receive an image, based on a time interval at which the signal is in the second state.

For example, the display driver circuit 120 may maintain the state of the signal to the second state, while the second scan of the image 730 in the GRAM 125 is executed.

Although the above examples illustrate that the processor 110 identifies whether the state of the signal is the first state or the second state (e.g., level mode), this is for convenience of explanation. The processor 110 may identify the change from the second state to the first state for identifying whether the image transmission may be executed (e.g., edge mode. When identifying whether to execute the image transmission based on the change from the second state to the first state, the display driver circuit 120 may execute operations that are at least partially different from the operations illustrated with reference to FIGS. 2, 3, 5, 6, and 7.

For example, when the processor 110 identifies the change from the second state to the first state, the display driver circuit 120 may change the state of the signal from the second state to the first state in response to a completion of a scan of an image. For example, when the processor 110 identifies the change from the second state to the first state, the display driver circuit 120 may refrain from changing from the second state to the first state, and execute a change from the first state to the second state or maintenance of the second state, while a scan of an image is executed. For example, when the processor 110 identifies the change from the second state to the first state, the display driver circuit 120 may execute the change from the first state in order to the second state to execute the change from the second state to the first state in response to a completion of a scan of the image. For example, the change from the first state to the second state may be executed after a first change from the second state to the first state, in order for a second change from the second state to the first state after the first change.

For example, the processor 110 may identify whether the change from the second state to the first state is within a time interval between a first timing and a second timing, in order to identify whether an image transmission is enabled at a third timing (e.g., a start timing of a vertical synchronization signal and/or a start timing of an emission synchronization signal). The first timing may be a timing before a reference time from a fourth timing (e.g., a start timing of a vertical synchronization signal and/or a start timing of an emission synchronization signal) at which an image transmission may be executed before (or just before) the third timing. The second timing may be a timing before the reference time from the third timing. For example, each of the third timing and the fourth timing may be a start timing of a vertical synchronization signal or a start timing of an emission synchronization signal. The first timing, the second timing, the third timing, the fourth timing, and the time interval may be illustrated by way of non-limiting example with reference to FIG. 8.

Figure 8:
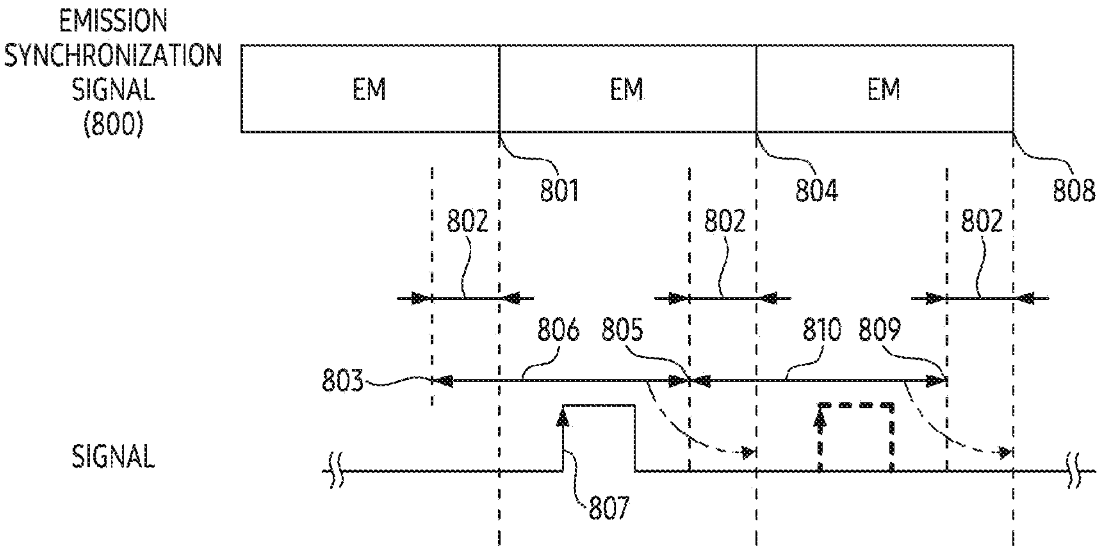
FIG. 8 illustrates an example of an image transmission from a processor to a display driver circuit executed based on identifying a change from a second state of a signal to a first state of the signal.

FIG. 8 illustrates an example of an image transmission from a processor to a display driver circuit executed based on identifying a change from a second state of a signal to a first state of the signal.

Referring to FIG. 8, the processor 110 may identify whether a time interval 806 between a timing 803 before a reference time 802 (e.g., the reference time 207, the reference time 305, the reference time 505, and/or the reference time 681) from a timing 801 of an emission synchronization signal 800 and a timing 805 before the reference time 802 from a timing 804 of the emission synchronization signal 800 includes a timing at which the signal is changed from the second state to the first state, in order to identify whether an image transmission is enabled at the timing 804 of the emission synchronization signal 800 (and/or a vertical synchronization signal). For example, the processor 110 may identify that the image transmission at the timing 804 is enabled, based on identifying that the time interval 806 includes a change 807 from the second state to the first state.

For example, the processor 110 may identify whether a time interval 810 between the timing 805 and a timing 809 before the reference time 802 from a timing 808 includes a timing at which the signal is changed from the second state to the first state, in order to identify whether an image transmission is enabled at the timing 808 of the emission synchronization signal 800. For example, the processor 110 may identify that the image transmission at the timing 808 is disabled, based on identifying that the time interval 810 does not include the change 807 from the second state to the first state.

As a non-limiting example, the above descriptions may be applied for a first mode (e.g., a video mode of a display serial interface (DSI)) that executes an image transmission from the processor 110 to the display driver circuit 120 form a timing identified (or targeted) by the processor 110 among the processor 110 and the display driver circuit 120. For example, the display driver circuit 120 may execute operations illustrated in greater detail below with reference to FIGS. 9, 10, 11, 12, 13 and 14 in order for a second mode distinct from the first mode. For example, the second mode may indicate a mode (e.g., a command mode of the DSI) that executes the image transmission from the processor 110 to the display driver circuit 120 from a timing identified (or targeted) by the display driver circuit 120 among the processor 110 and the display driver circuit 120.

For example, the display driver circuit 120 may provide the signal to the processor 110 for the second mode. As a non-limiting example, the signal for the second mode may be referred to as a tearing effect (TE) signal. For example, the signal may indicate a state of the display driver circuit 120 related to the image transmission. For example, the signal may be in the first state or the second state. For example, the display driver circuit 120 may change the state of the signal from the first state to the second state or change the state of the signal from the second state to the first state, in order for the second mode. For example, the change from the first state to the second state and the change from the second state to the first state may be illustrated in greater detail below with reference to FIGS. 9, 10, 11, 12, 13 and 14.

Figure 9:
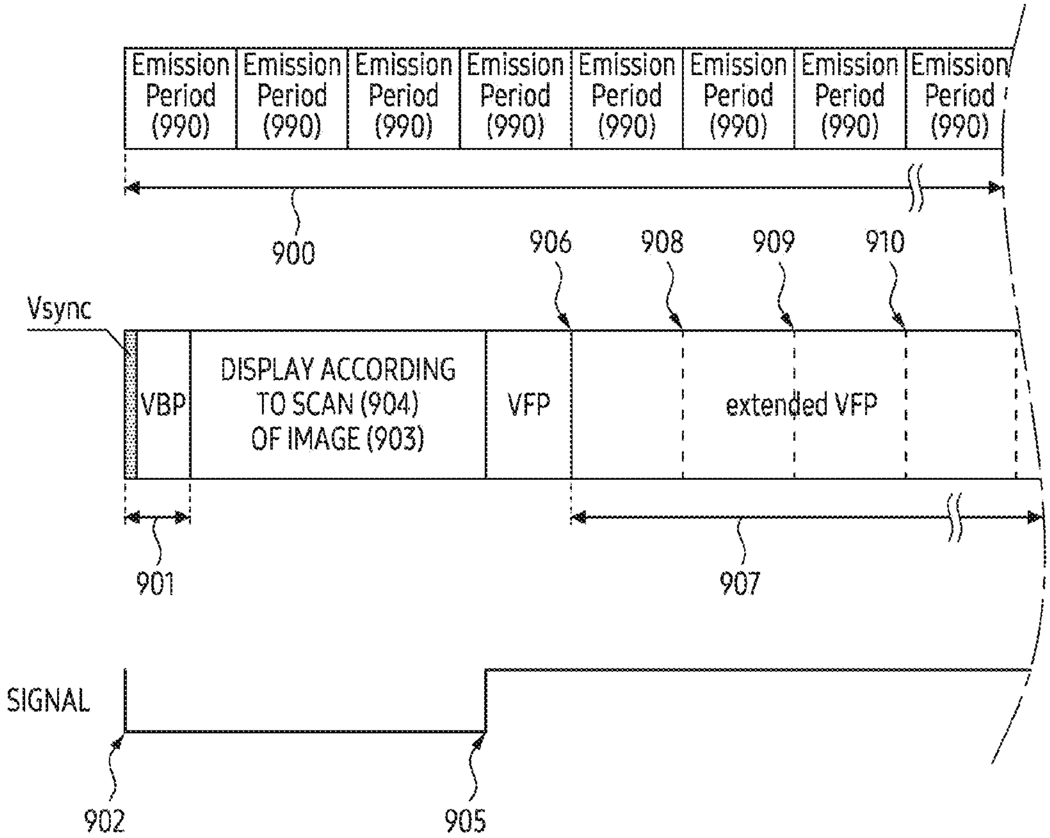
FIG. 9 illustrates an exemplary method of changing a state of a signal provided to a processor from a display driver circuit for a second mode from a second state to a first state.

FIG. 9 illustrates an exemplary method of changing a state of a signal provided to a processor from a display driver circuit for a second mode from a second state to a first state.

Referring to FIG. 9, the display driver circuit 120 may set the state of the signal provided from the display driver circuit 120 to the processor 110 to the second state, in response to identifying the image transmission from the processor 110 to the display driver circuit 120. As a non-limiting example, the image transmission may be identified based on a 2 Ch command. As a non-limiting example, the display driver circuit 120 may set the state of the signal to the second state by changing the state of the signal from the first state to the second state, within a back porch interval (e.g., a vertical back porch (VBP)) 901 of a vertical synchronization signal 900 for the display driver circuit 120, which is obtained based on the identification of the image transmission. As a non-limiting example, the display driver circuit 120 may set the state of the signal to the second state, by changing the state of the signal from the first state to the second state, at a start timing 902 of the vertical synchronization signal 900 for the display driver circuit 120, which is obtained in response to the identification of the image transmission.

For example, the display driver circuit 120 may store an image 903 received from the processor 110 according to the image transmission in the GRAM 125 based on the second mode, and execute a display according to a scan 904 of the image 903 in the GRAM 125 within an active interval of the vertical synchronization signal 900 for the display driver circuit 120 based on the second mode. For example, the display driver circuit 120 may change the state of the signal from the second state to the first state at a timing 905, in response to an end (or a completion) of the scan 904. For example, the timing 905 may be an end timing of the active interval of the vertical synchronization signal 900 for the display driver circuit 120.

For example, the display driver circuit 120 may extend a front porch interval of the vertical synchronization signal 900 for the display driver circuit 120, based on identifying that an image after the image 903 is not received from the processor 110 at a timing 906, which is an end timing of the front porch interval (e.g., a vertical front porch (VFP)) of the vertical synchronization signal 900 for the display driver circuit 120. For example, the display driver circuit 120 may obtain an extended front porch interval (e.g., an extended VFP) 907 of the vertical synchronization signal 900 for the display driver circuit 120 from the timing 906. For example, the display driver circuit 120 may maintain the state as the first state, while identifying that the image transmission is not executed. For example, the display driver circuit 120 may maintain the state as the first state so that the image transmission may be executed from each of a timing 908, a timing 909, and a timing 910 of an emission period 990. For example, unlike illustrated in FIG. 9, the processor 110 may execute the image transmission from each of the timing 908, the timing 909, and the timing 910 based on the signal in the first state.

Figure 10:
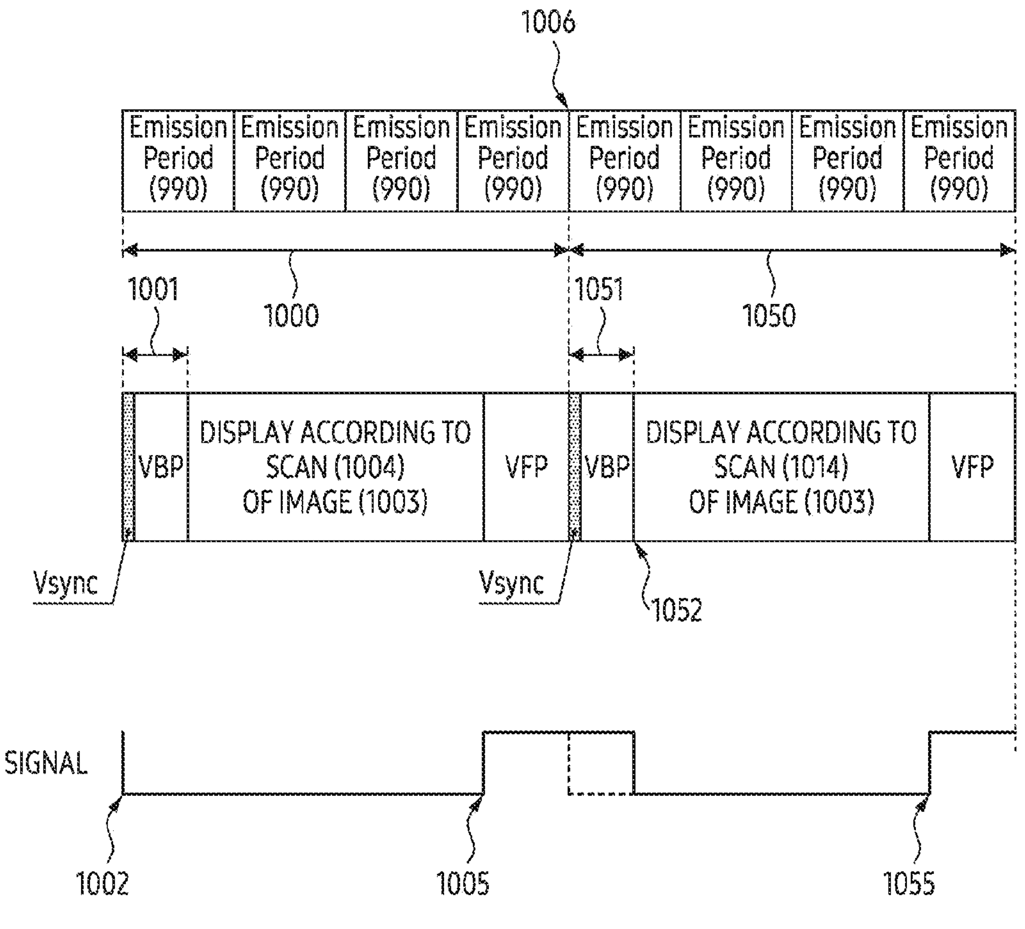
FIG. 10 illustrates an exemplary method of changing a state of a signal provided to a processor from a display driver circuit from a first state to a second state, according to re-display according to a scan of an image in a GRAM for a second mode.

FIG. 10 illustrates an exemplary method of changing a state of a signal provided to a processor from a display driver circuit from a first state to a second state, according to re-display according to a scan of an image in a GRAM for a second mode.

Referring to FIG. 10, the display driver circuit 120 may set the state of the signal provided from the display driver circuit 120 to the processor 110 to the second state, in response to identifying the image transmission from the processor 110 to the display driver circuit 120. As a non-limiting example, the image transmission may be identified based on a 2 Ch command. As a non-limiting example, the display driver circuit 120 may set the state of the signal to the second state by changing the state of the signal from the first state to the second state, within a back porch interval (e.g., a vertical back porch (VBP)) 1001 of a vertical synchronization signal 1000 for the display driver circuit 120, which is obtained based on the identification of the image transmission. As a non-limiting example, the display driver circuit 120 may set the state of the signal to the second state by changing the state of the signal from the first state to the second state, at a start timing 1002 of the vertical synchronization signal 1000 for the display driver circuit 120, which is obtained in response to the identification of the image transmission.

For example, the display driver circuit 120 may store an image 1003 received from the processor 110 according to the image transmission in the GRAM 125 based on the second mode, and execute a display according to a scan 1004 of the image 1003 in the GRAM 125 within an active interval of the vertical synchronization signal 1000 for the display driver circuit 120 based on the second mode. For example, the display driver circuit 120 may change the state of the signal from the second state to the first state at a timing 1005, in response to an end (or a completion) of the scan 1004. For example, the timing 1005 may be an end timing of the active interval of the vertical synchronization signal 1000 for the display driver circuit 120.

For example, the display driver circuit 120 may obtain a vertical synchronization signal 1050 for the display driver circuit 120 at a timing 1006. For example, the vertical synchronization signal 1050 for the display driver circuit 120 may be obtained for a re-display of the image 1003, unlike the vertical synchronization signal 1000 for the display driver circuit 120, which is obtained to display the image 1003 received from the processor 110. For example, the re-display of the image 1003 may be executed to reduce occurrence of an afterimage on the display panel 140 and/or occurrence of flickering on the display panel 140.

For example, the display driver circuit 120 may change the state of the signal from the first state to the second state, within a back porch interval 1051 of the vertical synchronization signal 1050 for the display driver circuit 120. For example, the display driver circuit 120 may change the state from the first state to the second state, before a start of a scan 1014 of the image 1003 in the GRAM 125 for the re-display. For example, the display driver circuit 120 may change the state from the first state to the second state at the timing 1006 (and/or a timing 1006 of the emission period 990), which is a start timing of the vertical synchronization signal 1050 for the display driver circuit 120. For another example, the display driver circuit 120 may change the state from the first state to the second state at a start timing 1052 (e.g., a start timing of an active interval of the vertical synchronization signal 1050 for the display driver circuit 120) of the scan

1014. For example, the change from the first state to the second state may be executed to reduce a reception of a new image during the scan 1014.

For example, the display driver circuit 120 may execute the re-display of the image 1003 according to the scan 1014 of the image 1003 in the GRAM 125, while the state of the signal is maintained in the second state. For example, the display driver circuit 120 may change the state of the signal from the second state to the first state at a timing 1055, in response to an end (or a completion) of the scan 1014. For example, the timing 1055 may be an end timing of the active interval of the vertical synchronization signal 1050 for the display driver circuit 120.

Figure 11:
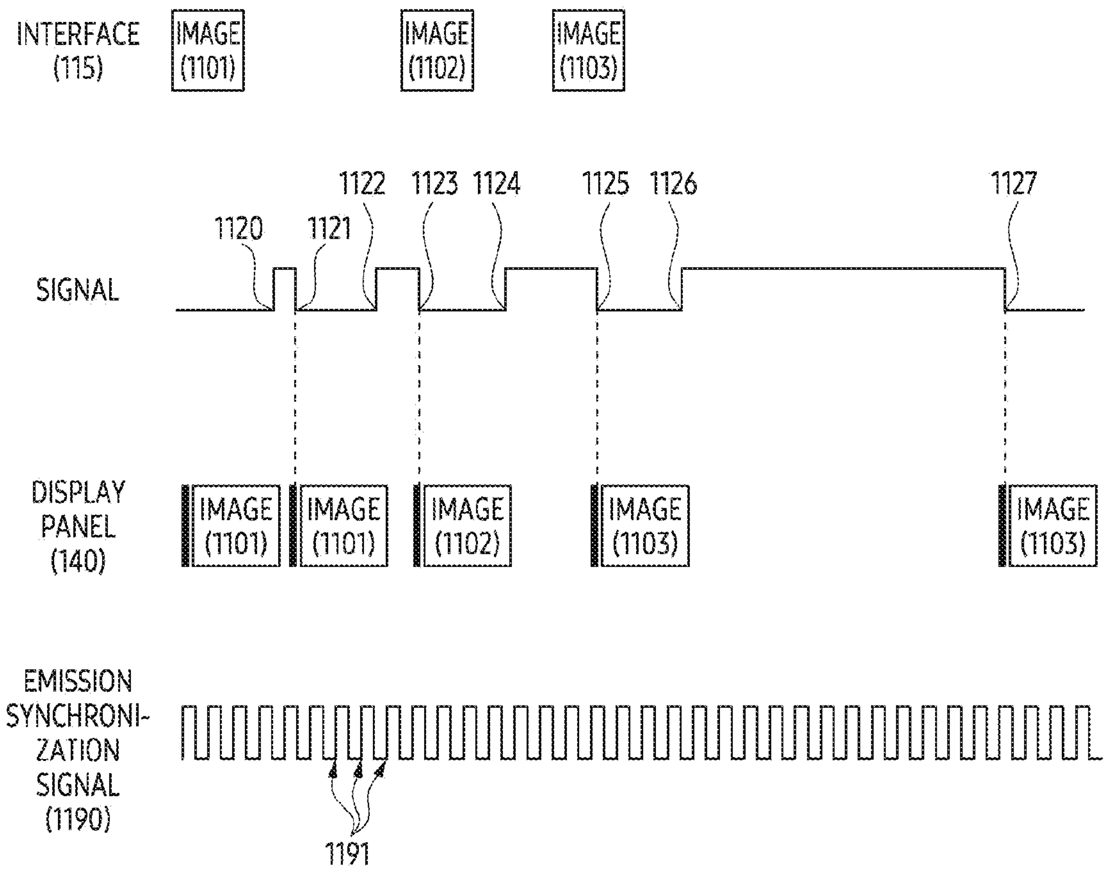
FIG. 11 illustrates an example of changing a state of a signal, based on an image transmission to a display driver circuit in a second mode and/or re-display of the image in the second mode.

FIG. 11 illustrates an example of changing a state of a signal, based on an image transmission to a display driver circuit in a second mode and/or re-display of the image in the second mode.

Referring to FIG. 11, the display driver circuit 120 may set the state of the signal provided from the display driver circuit 120 to the processor 110 to the second state, in response to an image 1101 received from the processor 110 according to the second mode. For example, the display driver circuit 120 may store the image 1101 in the GRAM 125, and display the image 1101 on the display panel 140 by scanning the image 1101 stored in the GRAM 125. For example, the state of the signal may be maintained in the second state during the scan of the image 1101. For example, the display driver circuit 120 may change the state of the signal from the second state to the first state at a timing 1120, in response to the end (or the completion) of the scan of the image 1101.

For example, the display driver circuit 120 may execute a re-display of the image 1101 to reduce occurrence of an afterimage and/or flickering on the display panel 140. For example, the display driver circuit 120 may change the state of the signal from the first state to the second state, at a start timing 1121 of the scan of the image 1101 in the GRAM 125 for the re-display of the image 1101, in order to reduce execution of the image transmission from the processor 110 to the display driver circuit 120 according to the second mode at timings 1191 of an emission synchronization signal 1190 indicating an emission period. For example, the display driver circuit 120 may execute the re-display of the image 1101 based on the scan of the image 1101 in the GRAM 125 from the start timing 1121. For example, the display driver circuit 120 may maintain the state of the signal in the second state during the scan of the image 1101 in the GRAM 125. For example, the display driver circuit 120 may change the state of the signal from the second state to the first state at a timing 1122, in response to an end (or a completion) of the scan of the image 1101 in the GRAM 125 for the re-display of the image 1101. For example, the display driver circuit 120 may maintain the state of the signal in the first state, on a condition that the image transmission is not executed and the re-display of the image 1101 is not scheduled.

For example, the display driver circuit 120 may change the state of the signal from the first state to the second state at a timing 1123, in response to identifying that an image 1102 next to the image 1101 is received from the processor 110 based on the second mode. For example, the display driver circuit 120 may store the image 1102 in the GRAM 125, and display the image 1102 on the display panel 140 by scanning the image 1102 stored in the GRAM 125. For example, the state of the signal may be maintained in the second state during the scan of the image 1102. For example, the display driver circuit 120 may change the state of the signal from the second state to the first state at a timing 1124, in response to an end (or a completion) of the scan of the image 1102. For example, the first state of the signal may be maintained on a condition that an image transmission is not executed and a re-display of the image 1102 is not scheduled.

For example, the display driver circuit 120 may change the state of the signal from the first state to the second state at a timing 1125, in response to identifying that an image 1103 next to the image 1102 is received from the processor 110 based on the second mode. For example, the display driver circuit 120 may store the image 1103 in the GRAM 125, and display the image 1103 on the display panel 140 by scanning the image 1103 stored in the GRAM 125. For example, the state of the signal may be maintained in the second state during the scan of the image 1103. For example, the display driver circuit 120 may change the state of the signal from the second state to the first state at a timing 1126, in response to an end (or a completion) of the scan of the image 1103. For example, the first state of the signal may be maintained on a condition that an image transmission is not executed and a re-display of the image 1103 is not scheduled.

For example, the display driver circuit 120 may maintain the state of the signal to the first state, while a new image is not received from the processor 110 based on the second mode. For example, the display driver circuit 120 may refrain from executing the re-display of the image 1103 while the image 1103 is maintained on the display panel 140, and maintain the state of the signal in the first state, in order to reduce the power consumed for a display on the display panel 140.

For example, the display driver circuit 120 may execute the re-display of the image 1103 by scanning the image 1103 in the GRAM 125 based on the second mode, to maintain the image 1103. For example, the display driver circuit 120 may change the state of the signal from the first state to the second state, at a start timing 1127 of a scan of the image 1103 in the GRAM 125 for the re-display of the image 1103. For example, the display driver circuit 120 may execute the re-display of the image 1103, based on the scan of the image 1103 in the GRAM 125 from the start timing 1127. For example, the display driver circuit 120 may maintain the state of the signal in the second state during the scan of the image 1103 in the GRAM 125.

Although descriptions of FIGS. 9, 10 and 11 illustrate the processor 110 identifying (e.g., level mode) whether the state of the signal is the first state or the second state for the second mode, the processor 110 may also identify a change from the second state to the first state (e.g., edge mode). For example, on a condition that the processor 110 identifies the change from the second state to the first state, the display driver circuit 120 may change the state of the signal, unlike the descriptions of FIGS. 9 to 11 at least in part. For example, the change in the state of the signal may be illustrated in greater detail below with reference to FIGS. 12, 13 and 14.

Figure 12:
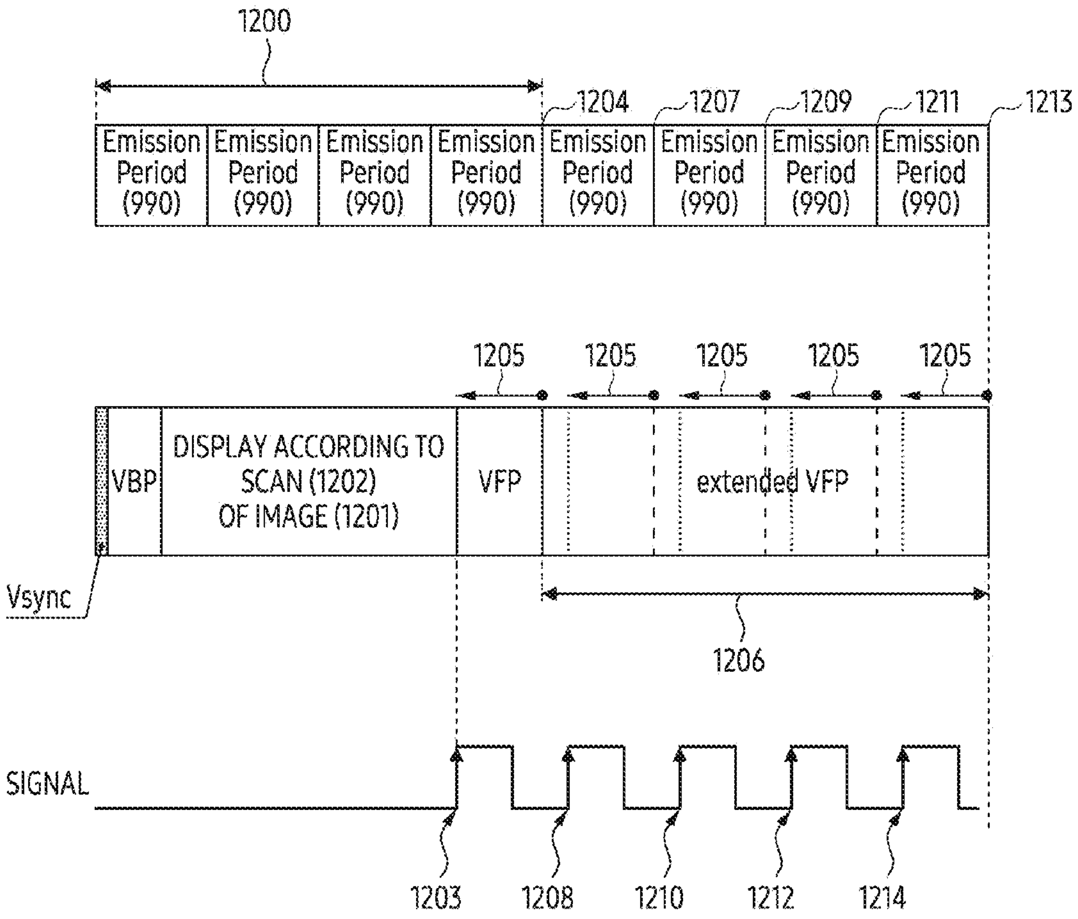
FIGS. 12 and 13 illustrate an exemplary method of changing a state of a signal from a display driver circuit to a processor for a processor identifying a change from a second state to a first state according to a second mode.
Figure 13:
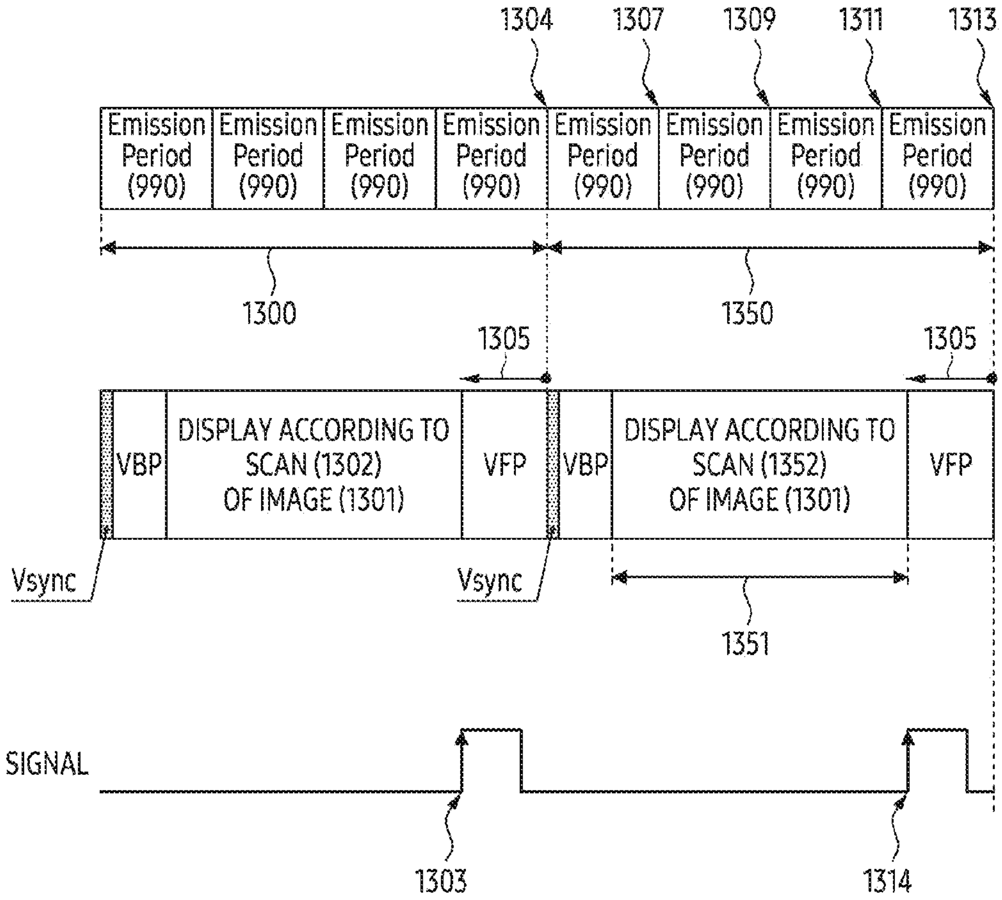

FIGS. 12 and 13 illustrate an exemplary method of changing a state of a signal from a display driver circuit to a processor for a processor identifying a change from a second state to a first state according to a second mode.

Referring to FIG. 12, the display driver circuit 120 may maintain the state of the signal provided from the display driver circuit 120 to the processor 110 in the second state, while storing an image 1201 received from the processor 110 based on the second mode in the GRAM 125 and executing a display according to a scan 1202 of the image 1201 in the GRAM 125 based on the second mode, based on a vertical synchronization signal 1200 for the display driver circuit 120. For example, the display driver circuit 120 may change the state of the signal from the second state to the first state, at a timing 1203 in response to an end (or a completion) of the scan 1202. For example, the display driver circuit 120 may execute the change from the second state to the first state at the timing 1203, to indicate that the image transmission from the processor 110 to the display driver circuit 120 at a timing 1204 of the emission period 990 may be executed. For example, the display driver circuit 120 may change the first state to the second state, in order for a change from the second state to the first state to be executed after the change from the second state to the first state at the timing 1203.

For example, the processor 110 may identify that the image transmission at the timing 1204 is enabled, based on the change from the second state to the first state at the timing 1203. For example, the processor 110 may identify whether the change from the second state to the first state is executed within a reference time interval 1205 before the timing 1204 capable of executing the image transmission, and identify that the image transmission is enabled at the timing 1204, in response to identifying that the change from the second state to the first state is executed within the reference time interval 1205. As a non-limiting example, a length of the reference time interval 1205 may correspond to (or be the same as) a length of a front porch interval (e.g., a vertical front porch (VFP)) of the vertical synchronization signal 1200. As a non-limiting example, the length of the reference time interval 1205 may be longer than the length of the front porch interval.

For example, the display driver circuit 120 may obtain an extended front porch interval (e.g., an extended VFP) 1206 of the vertical synchronization signal 1200 for the display driver circuit 120, based on identifying that an image next to the image 1201 is not received from the processor 110 at the timing 1204, which is an end timing of the front porch interval of the vertical synchronization signal 1200 for the display driver circuit 120.

For example, the display driver circuit 120 may change the state of the signal from the second state to the first state within the reference time interval 1205 before a timing 1207, in order to indicate enabling the image transmission at the timing 1207 of the emission period 990. For example, the change from the second state to the first state may be within the extended front porch interval 1206 of the vertical synchronization signal 1200 for the display driver circuit 120. As a non-limiting example, the change from the second state to the first state may be executed at a timing 1208 within the reference time interval 1205 before the timing 1207. For example, the display driver circuit 120 may change the first state to the second state, to a change from the second state to the first state to be executed after the change from the second state to the first state at the timing 1208.

For example, the processor 110 may identify that the image transmission is enabled at the timing 1207, in response to identifying that the change from the second state to the first state is executed within the reference time interval 1205 before the timing 1207.

For example, the display driver circuit 120 may maintain the extended front porch interval 1206, based on identifying that the image transmission at the timing 1207 is not executed.

For example, the display driver circuit 120 may change the state of the signal from the second state to the first state within the reference time interval 1205 before a timing 1209, in order to indicate enabling the image transmission at the timing 1209 of the emission period 990. For example, the change from the second state to the first state may be within the extended front porch interval 1206 of the vertical synchronization signal 1200 for the display driver circuit 120. As a non-limiting example, the change from the second state to the first state may be executed at a timing 1210 within the reference time interval 1205 before the timing 1209. For example, the display driver circuit 120 may change the first state to the second state, in order for a change from the second state to the first state to be executed after the change from the second state to the first state at the timing 1210.

For example, the processor 110 may identify that the image transmission is enabled at the timing 1209, in response to identifying that the change from the second state to the first state is executed within the reference time interval 1205 before the timing 1209.

For example, the display driver circuit 120 may maintain the extended front porch interval 1206, based on identifying that the image transmission at the timing 1209 is not executed.

For example, the display driver circuit 120 may change the state of the signal from the second state to the first state within the reference time interval 1205 before a timing 1211, in order to indicate enabling the image transmission at the timing 1211 of the emission period 990. For example, the change from the second state to the first state may be within the extended front porch interval 1206 of the vertical synchronization signal 1200 for the display driver circuit 120. As a non-limiting example, the change from the second state to the first state may be executed at a timing 1212 within the reference time interval 1205 before the timing 1211. For example, the display driver circuit 120 may change the first state to the second state, for a change from the second state to the first state to be executed after the change from the second state to the first state at the timing 1212.

For example, the processor 110 may identify that the image transmission at the timing 1211 is enabled, in response to identifying that the change from the second state to the first state is executed within the reference time interval 1205 before the timing 1211.

For example, the display driver circuit 120 may maintain the extended front porch interval 1206 based on identifying that the image transmission at the timing 1211 is not executed.

For example, the display driver circuit 120 may change the state of the signal from the second state to the first state within the reference time interval 1205 before a timing 1213, in order to indicate enabling the image transmission at the timing 1213 of the emission period 990. For example, the change from the second state to the first state may be within the extended front porch interval 1206 of the vertical synchronization signal 1200 for the display driver circuit 120. As a non-limiting example, the change from the second state to the first state may be executed at a timing 1214 within the reference time interval 1205 before the timing 1213. For example, the display driver circuit 120 may change the first state to the second state, in order for a change from the second state to the first state to be executed after the change from the second state to the first state at the timing 1214.

For example, the processor 110 may identify that the image transmission is enabled at the timing 1213, in response to identifying that the change from the second state to the first state is executed within the reference time interval 1205 before the timing 1213.

As described above, the display driver circuit 120 may change the state of the signal, according to a cycle of the emission period 990 within a time interval (e.g., the extended front porch interval 1206) at which a scan of an image is not executed.

Referring to FIG. 13, the display driver circuit 120 may maintain the state of the signal provided to the processor 110 from the display driver circuit 120 in the second state, while storing an image 1301 received from the processor 110 in the GRAM 125 based on the second mode and executing a display according to a scan 1302 of the image 1301 within the GRAM 125 based on the second mode, based on a vertical synchronization signal 1300 for the display driver circuit 120. For example, the display driver circuit 120 may change the state of the signal from the second state to the first state at a timing 1303 in response to an end (or a completion) of the scan 1302. For example, the display driver circuit 120 may execute the change from the second state to the first state at the timing 1303, to indicate that the image transmission from the processor 110 to the display driver circuit 120 may be executed at a timing 1304 of the emission period 990. For example, the display driver circuit 120 may change the first state to the second state, in order for a change from the second state to the first state to be executed after the change from the second state to the first state at the timing 1303.

For example, the processor 110 may identify that the image transmission is enabled at the timing 1304, based on the change from the second state to the first state at the timing 1303. For example, the processor 110 may identify whether the change from the second state to the first state is executed within a reference time interval 1305 before the timing 1304 capable of executing the image transmission, and identify that the image transmission is enabled at the timing 1304 in response to identifying that the change from the second state to the first state is executed within the reference time interval 1305. As a non-limiting example, a length of the reference time interval 1305 may correspond to (or be the same as) a length of a front porch interval (e.g., a vertical front porch (VFP)) of the vertical synchronization signal 1300. As a non-limiting example, the length of the reference time interval 1305 may be longer than the length of the front porch interval.

For example, based on identifying that the image transmission is not executed, the display driver circuit 120 may obtain a vertical synchronization signal 1350 for the display driver circuit 120 from the timing 1304, to reduce an afterimage and/or flickering on the display panel 140. For example, the display driver circuit 120 may execute a re-display according to a scan 1352 of the image 1301, to reduce the afterimage and/or the flickering. For example, the display driver circuit 120 may maintain the state of the signal in the second state during the scan 1352. For example, the display driver circuit 120 may maintain the state of the signal in the second state, in order to indicate that the image transmission at each of a timing 1307, a timing 1309, and a timing 1311 of the emission period 990 within the time interval 1351 at which the scan 1352 (e.g., an active interval of the vertical synchronization signal 1350 for the display driver circuit 120) is executed is disabled. For example, since the change from the second state to the first state is not executed within the time interval 1351, the processor 110 may recognize that the image transmission at each of the timing 1307, the timing 1309, and the timing 1311 is disabled. For example, the processor 110 may identify disabling the image transmission at the timing 1307 based on identifying that the change from the second state to the first state is not present within the reference time interval 1305 (not shown in FIG. 13) before the timing 1307, identify disabling the image transmission at the timing 1309 based on identifying that the change from the second state to the first state is not present within the reference time interval 1305 (not shown in FIG. 13) before the timing 1309, and identify disabling the image transmission at the timing 1311 based on identifying that the change from the second state to the first state is not present within the reference time interval 1305 (not illustrated in FIG. 13) before the timing 1311.

For example, the display driver circuit 120 may change the state of the signal from the second state to the first state at a timing 1314 in response to a completion of the scan 1352. For example, the change from the second state to the first state at the timing 1314 may be within the reference time interval 1305 before a timing 1313 of the emission period 990. For example, the change from the second state to the first state in the timing 1314 may indicate enabling the image transmission at the timing 1313.

Figure 14:
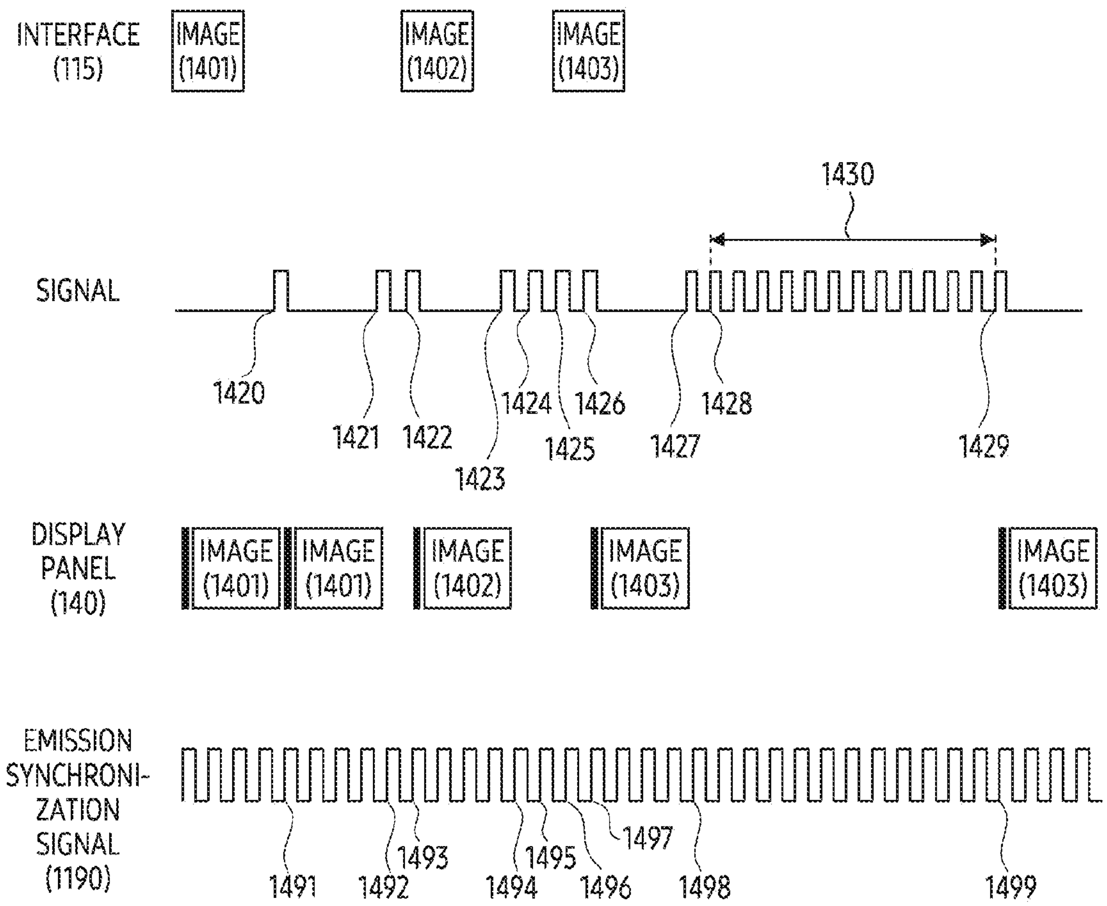
FIG. 14 illustrates an example of changing a state of a signal for a processor identifying a change from a second state to a first state based on an image transmission to a display driver circuit in a second mode and/or re-display of the image in the second mode.

FIG. 14 illustrates an example of changing a state of a signal for a processor identifying a change from a second state to a first state based on an image transmission to a display driver circuit in a second mode and/or re-display of the image in the second mode.

Referring to FIG. 14, the display driver circuit 120 may set the state of the signal provided from the display driver circuit 120 to the processor 110 to the second state, in response to an image 1401 received from the processor 110 according to the second mode. For example, the display driver circuit 120 may store the image 1401 in the GRAM 125 and display the image 1401 on the display panel 1401 by scanning the image 1401 stored in the GRAM 125. For example, the state of the signal may be maintained in the second state during a scan of the image 1401. For example, the display driver circuit 120 may change the state of the signal from the second state to the first state at a timing 1420, in response to an end (or a completion) of the scan of the image 1401. For example, the timing 1420 may be within a reference time interval (not shown in FIG. 14) (e.g., the reference time interval 1205 and the reference time interval 1305) before a timing 1491 of an emission synchronization signal 1190. For example, the change from the second state to the first state at the timing 1420 may indicate enabling the image transmission at the timing 1491. For example, the display driver circuit 120 may change the state of the signal from the first state to the second state, in order for the change from the second state to the first state, which will be executed after the change from the second state to the first state at the timing 1420.

For example, the display driver circuit 120 may execute a re-display of the image 1401 to reduce occurrence of an afterimage and/or flickering on the display panel 140. For example, the display driver circuit 120 may maintain the state of the signal in the second state, during the scan of the image 1401 in the GRAM 125 for the re-display of the image 1401. For example, the display driver circuit 120 may change the state of the signal from the second state to the first state at a timing 1421, in response to an end (or a completion) of the scan of the image 1401 in the GRAM 125 for the re-display of the image 1401. For example, the timing 1421 may be within the reference time interval before a timing 1492 of the emission synchronization signal 1190. For example, the change from the second state to the first state at the timing 1421 may indicate enabling the image transmission at the timing 1492. For example, the display driver circuit 120 may change the state of the signal from the first state to the second state, in order for the change from the second state to the first state, which will be executed after the change from the second state to the first state at the timing 1421.

For example, the display driver circuit 120 may change the state of the signal from the second state to the first state at a timing 1422. For example, the timing 1422 may be within the reference time interval before a timing 1493 of the emission synchronization signal 1190. For example, the change from the second state to the first state at the timing 1422 may indicate enabling the image transmission at the timing 1493. For example, the display driver circuit 120 may change the state of the signal from the first state to the second state, for the change from the second state to the first state, which will be executed after the change from the second state to the first state at the timing 1422.

For example, the processor 110 may transmit the image 1402 to the display driver circuit 120 in the second mode according to the timing 1493, based on identifying that the change (e.g., the change from the second state to the first state at the timing 1422) from the second state to the first state is executed within the reference time interval before the timing 1493. For example, the display driver circuit 120 may store the image 1402 in the GRAM 125 and display the image 1402 on the display panel 140 by scanning the image 1402 stored in the GRAM 125. For example, the state of the signal may be maintained in the second state during a scan of the image 1402. For example, the display driver circuit 120 may change the state of the signal from the second state to the first state at a timing 1423, in response to an end (or a completion) of the scan of the image 1402. For example, the timing 1423 may be within the reference time interval before a timing 1494 of the emission synchronization signal 1190. For example, the change from the second state to the first state at the timing 1423 may indicate enabling the image transmission at the timing 1494. For example, the display driver circuit 120 may change the state of the signal from the first state to the second state, in order for the change from the second state to the first state, which will be executed after the change from the second state to the first state at the timing 1423.

For example, the display driver circuit 120 may change the state of the signal from the second state to the first state at a timing 1424. For example, the timing 1424 may be within the reference time interval before a timing 1495 of the emission synchronization signal 1190. For example, the change from the second state to the first state at the timing 1424 may indicate enabling the image transmission at the timing 1495. For example, the display driver circuit 120 may change the state of the signal from the first state to the second state, in order for the change from the second state to the first state, which will be executed after the change from the second state to the first state at the timing 1424.

For example, the display driver circuit 120 may change the state of the signal from the second state to the first state at a timing 1425. For example, the timing 1425 may be within the reference time interval before a timing 1496 of the emission synchronization signal 1190. For example, the change from the second state to the first state at the timing 1425 may indicate enabling the image transmission at the timing 1496. For example, the display driver circuit 120 may change the state of the signal from the first state to the second state, in order for the change from the second state to the first state, which will be executed after the change from the second state to the first state at the timing 1425.

For example, the display driver circuit 120 may change the state of the signal from the second state to the first state at a timing 1426. For example, the timing 1426 may be within the reference time interval before a timing 1497 of the emission synchronization signal 1190. For example, the change from the second state to the first state at the timing 1426 may indicate enabling the image transmission at the timing 1497. For example, the display driver circuit 120 may change the state of the signal from the first state to the second state, for the change from the second state to the first state, which will be executed after the change from the second state to the first state at the timing 1426.

For example, the processor 110 may transmit an image 1403 to the display driver circuit 120 in the second mode according to the timing 1497, based on identifying that the change (e.g., the change from the second state to the first state at the timing 1426) from the second state to the first state is executed within the reference time interval before the timing 1497. For example, the display driver circuit 120 may store the image 1403 in the GRAM 125 and display the image 1403 on the display panel 140 by scanning the image 1403 stored in the GRAM 125. For example, the state of the signal may be maintained in the second state during a scan of the image 1403. For example, the display driver circuit 120 may change the state of the signal from the second state to the first state at a timing 1427, in response to an end (or a completion) of the scan of image 1403. For example, the timing 1427 may be within the reference time interval before a timing 1498 of the emission synchronization signal 1190. For example, the change from the second state to the first state at the timing 1427 may indicate enabling the image transmission at the timing 1498. For example, the display driver circuit 120 may change the state of the signal from the first state to the second state, in order for the change from the second state to the first state, which will be executed after the change from the second state to the first state at the timing 1427.

For example, the display driver circuit 120 may refrain from executing a re-display of the image 1403 while the image 1403 is maintained on the display panel 140, to reduce the power consumed for a display on the display panel 140. For example, the display driver circuit 120 may execute the change from the second state to the first state at each of the timing 1423, the timing 1424, the timing 1425, and the timing 1426, during a time 1430 between a timing 1428 and a timing 1429. For example, the display driver circuit 120 may repeatedly execute the change from the second state to the first state while the image 1403 is maintained on the display panel 140.

For example, the display driver circuit 120 may change the state of the signal from the second state to the first state at the timing 1429. For example, the timing 1429 may be within the reference time interval before a timing 1499 of the emission synchronization signal 1190. For example, the change from the second state to the first state at the timing 1429 may indicate enabling the image transmission at the timing 1499. For example, the display driver circuit 120 may change the state of the signal from the first state to the second state, in order for the change from the second state to the first state, which will be executed after the change from the second state to the first state at the timing 1429.

For example, the display driver circuit 120 may execute a re-display of the image 1403 by scanning the image 1403 in the GRAM 125 according to the second mode to maintain the image 1403, based on identifying that the image transmission from the timing 1499 is not executed. For example, the display driver circuit 120 may maintain the state of the signal in the second state, based on the scan of the image 1403 in the GRAM 125 for the re-display of the image 1403.

As described above, the signal provided from the display driver circuit 120 to the processor 110 may indicate a state of the display driver circuit 120 related to a display on the display panel 140. The electronic device 100 may provide a service of enhanced quality through the display 105 using the signal.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In various embodiments, at least one of the components (e.g., the connecting terminal 1578) may be omitted from the electronic device 1501, or one or more other components may be added in the electronic device 1501. In various embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 1564 dB or less) for implementing mMTC, or U-plane latency (e.g., 0.5 ms or less for each of downlink (DL) and uplink (UL), or a round trip of 15 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element including a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In an embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

FIG. 16 is a block diagram 1600 illustrating the display module 1560 according to various embodiments. Referring to FIG. 16, the display module 1560 may include a display 1610 and a display driver integrated circuit (DDI) 1630 to control the display 1610. The DDI 1630 may include an interface module 1631, memory 1633 (e.g., buffer memory), an image processing module 1635, and/or a mapping module 1637. The various modules 1631, 1635, 1637 may include various processing circuitry and/or executable program instructions. The DDI 1630 may receive image information that contains image data or an image control signal corresponding to a command to control the image data from another component of the electronic device 1501 via the interface module 1631. For example, according to an embodiment, the image information may be received from the processor 1520 (e.g., the main processor 1521 (e.g., an application processor)) or the auxiliary processor 1523 (e.g., a graphics processing unit) operated independently from the function of the main processor 1521. The DDI 1630 may communicate, for example, with touch circuitry 1550 or the sensor module 1576 via the interface module 1631. The DDI 1630 may also store at least part of the received image information in the memory 1633, for example, on a frame by frame basis. The image processing module 1635 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1610. The mapping module 1637 may generate a voltage value or a current value corresponding to the image data pre-processed or post-processed by the image processing module 1635. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1610 may be driven, for example, based at least in part on the voltage value or the current value such that visual information (e.g., a text, an image, or an icon) corresponding to the image data may be displayed via the display 1610.

According to an embodiment, the display module 1560 may further include touch circuitry 1650. The touch circuitry 1650 may include a touch sensor 1651 and a touch sensor IC 1653 to control the touch sensor 1651. The touch sensor IC 1653 may control the touch sensor 1651 to sense a touch input or a hovering input with respect to a certain position on the display 1610. To achieve this, for example, the touch sensor 1651 may detect (e.g., measure) a change in a signal (e.g., a voltage, a quantity of light, a resistance, or a quantity of one or more electric charges) corresponding to the certain position on the display 1610. The touch circuitry 1650 may provide input information (e.g., a position, an area, a pressure, or a time) indicative of the touch input or the hovering input detected via the touch sensor 1651 to the processor 1520. According to an embodiment, at least part (e.g., the touch sensor IC 1653) of the touch circuitry 1650 may be formed as part of the display 1610 or the DDI 1630, or as part of another component (e.g., the auxiliary processor 1523) disposed outside the display module 1560.

According to an embodiment, the display module 1560 may further include at least one sensor (e.g., a fingerprint sensor, an iris sensor, a pressure sensor, or an illuminance sensor) of the sensor module 1576 or a control circuit for the at least one sensor. In such a case, the at least one sensor or the control circuit for the at least one sensor may be embedded in one portion of a component (e.g., the display 1610, the DDI 1630, or the touch circuitry 1550)) of the display module 1560. For example, when the sensor module 1576 embedded in the display module 1560 includes a biometric sensor (e.g., a fingerprint sensor), the biometric sensor may obtain biometric information (e.g., a fingerprint image) corresponding to a touch input received via a portion of the display 1610. As another example, when the sensor module 1576 embedded in the display module 1560 includes a pressure sensor, the pressure sensor may obtain pressure information corresponding to a touch input received via a partial or whole area of the display 1610. According to an embodiment, the touch sensor 1651 or the sensor module 1576 may be disposed between pixels in a pixel layer of the display 1610, or over or under the pixel layer.

As described above, an electronic device may comprise: a processor and a display including a display panel and a display driver circuit including a memory. According to an example embodiment, the display driver circuit may be configured to identify an event for a display on the display panel. According to an example embodiment, the display driver circuit may be configured to, in response to the event of a first type that executes the display through the memory, change, at a timing before a reference time from a start timing of a scan for the display, a state of a signal provided from the display driver circuit to the processor from a first state indicating enabling image transmission to the display driver circuit to a second state indicating disabling image transmission. According to an example embodiment, the display driver circuit may be configured to, in response to the event of a second type that executes the display by bypassing the memory, change, at the start timing, the state of the signal provided from the display driver circuit to the processor from the first state to the second state.

According to an example embodiment, the display driver circuit may be configured to change, in response to a completion of the scan executed in response to the event of the first type, the state from the second state to the first state.

According to an example embodiment, the display driver circuit may be configured to change, in response to a completion of the scan executed in response to the event of the second type, the state from the second state to the first state.

According to an example embodiment, the timing may include a front porch interval of a vertical synchronization signal for the display driver circuit or an extended front porch interval of the vertical synchronization signal.

According to an example embodiment, the event of the first type may be identified based on a refresh rate for the display.

According to an example embodiment, the event of the first type may be identified based on a refresh rate for at least one display on the display panel executed before the display.

According to an example embodiment, the event of the first type may be identified based on a control command indicating storing an image from the processor in the memory or indicating enabling the memory.

According to an example embodiment, the event of the second type may be identified based on a vertical sync start (VSS) packet received before an image received from the processor for the display.

According to an example embodiment, the processor may be configured to identify the state of the signal provided from the display driver circuit. According to an example embodiment, the processor may be configured to, in response to a start timing of a synchronization signal for the image transmission, execute image transmission, based on the signal in the first state. According to an example embodiment, the processor may be configured to, while the signal in the second state is provided, defer image transmission.

According to an example embodiment, the processor may be configured to execute, at the start timing of the synchronization signal, image transmission deferred while the signal in the second state is provided, based on identifying that the state is changed from the second state to the first state.

According to an example embodiment, the synchronization signal may be a vertical synchronization signal or an emission synchronization signal.

According to an example embodiment, the display driver circuit may be configured to change, while the display is not executed, the state from the second state to the first state, based on a timing of a synchronization signal for the image transmission.

According to an example embodiment, the processor may be configured to execute image transmission at the timing of the synchronization signal in response to the change from the second state to the first state.

According to an example embodiment, the display driver circuit may be configured to provide, to the processor, the signal, based on a refresh rate for the display being lower than a reference refresh rate. According to an example embodiment, the display driver circuit may be configured to cease to provide, to the processor, the signal, based on the refresh rate being higher than or equal to the reference refresh rate.

According to an example embodiment, the memory may be disabled while providing the signal to the processor is ceased.

As described above, an electronic device may comprise a processor, and a display including a display panel and a display driver circuit including a memory. According to an example embodiment, the display driver circuit may be configured to provide, to the processor, a signal in a second state that indicates disabling an image transmission to the display driver circuit, while displaying an image received from the processor on the display panel. According to an example embodiment, the display driver circuit may be configured to store, in the memory, the image received from the processor. According to an example embodiment, the display driver circuit may be configured to, in response to a completion of a first scan of the image for the display, change a state of the signal from the second state to a first state that indicates enabling image transmission. According to an example embodiment, the display driver circuit may be configured to change, at a timing before a reference time from a start timing of a second scan of the image stored in the memory, the state from the first state to the second state.

According to an example embodiment, the timing may include a front porch interval of a vertical synchronization signal for the display driver circuit or an extended front porch interval of the vertical synchronization signal.

According to an example embodiment, the processor may be configured to identify the state of the signal provided from the display driver circuit. According to an example embodiment, the processor may be configured to execute, in response to a start timing of a synchronization signal for the image transmission, the image transmission, while the signal in the first state is provided. According to an example embodiment, the processor may be configured to defer the image transmission, while the signal in the second state is provided.

According to an example embodiment, the processor may be configured to, while the signal in the second state is provided, obtain another image distinct from the image and defer transmitting the other image to the display driver circuit. According to an example embodiment, the processor may be configured to, in response to the signal in the first state changed from the second state, transmit, to the display driver circuit, the other image at the start timing of the synchronization signal.

According to an example embodiment, the display driver circuit may be configured to change, in response to a completion of the second scan, the state from the second state to the first state. According to an example embodiment, the processor may be configured to, before the change from the second state to the first state that is executed in response to the completion of the second scan, obtain another image distinct from the image and defer transmitting, to the display driver circuit, the other image. According to an example embodiment, the processor may be configured to transmit, to the display driver circuit, the other image, based on identifying the change from the second state to the first state that is executed in response to the completion of the second scan.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor comprising processing circuitry; and a display device comprising:

a display panel, and display driver circuitry, including a memory configured to store an image transmitted from the at least one processor to the display driver circuitry, configured to:

transmit, to the at least one processor, a signal indicating whether an image transmission from the at least one processor to the display driver circuitry is allowed, wherein a state of the signal comprises:

a first state for allowing an image transmission from the at least one processor to the display driver circuitry, and a second state for disallowing an image transmission from the at least one processor to the display driver circuitry; and based on scanning being performed by the display driver circuitry for displaying an image via the display panel, perform a transition of the state of the signal from the first state to the second state, wherein a timing at which the transition of the state of the signal from the first state to the second state is performed is determined based on whether a vertical sync start (VSS) packet is received from the at least one processor.

2. The electronic device of claim 1, wherein the display driver circuitry is configured to:

based on receiving a VSS packet from the at least one processor, perform the transition of the state of the signal from the first state to the second state at a start timing of scanning performed for displaying an image transmitted from the at least one processor with respect to the VSS packet.

3. The electronic device of claim 2, wherein the display driver circuitry is configured to:

based on receiving the VSS packet from the at least one processor, perform the scanning for displaying the image transmitted from the at least one processor with respect to the VSS packet in accordance with bypassing the memory of the display driver circuitry; and perform the transition of the state of the signal from the first state to the second state at the start timing of the scanning performed in accordance with the memory of the display driver circuitry.

4. The electronic device of claim 1, wherein the display driver circuitry is configured to:

based on no VSS packet being received, perform scanning for displaying an image stored in the memory; and before a start timing of the scanning performed for displaying an image stored in the memory based on no VSS packet being received, perform the transition of the state of the signal from the first state to the second state.

5. The electronic device of claim 4, wherein the display driver circuitry is configured to:

based on a refresh rate of an image to be displayed via the display panel:

store the image, received from the at least one processor, associated with the refresh rate, in the memory of the display driver circuitry, and perform scanning for displaying the image, stored in the memory, associated with the refresh rate.

6. The electronic device of claim 4, wherein the display driver circuitry is configured to:

based on a first refresh rate previous to a second refresh rate of an image to be displayed via the display panel:

store the image, received from the at least one processor, associated with the second refresh rate, in the memory of the display driver circuitry, and perform scanning for displaying the image, stored in the memory, associated with the second refresh rate.

7. The electronic device of claim 4, wherein the display driver circuitry is configured to:

in response to a timing being before a reference time from a start timing of the scanning performed for displaying an image stored in the memory based on no VSS packet being received, perform the transition of the state of the signal from the first state to the second state.

8. The electronic device of claim 7, wherein the timing is within a front porch interval of a vertical synchronization signal used by the display driver circuitry for displaying an image via the display panel.

9. The electronic device of claim 4, wherein the display driver circuitry is configured to:

based on receiving at least one control command indicating storing an image transmitted from the at least one processor to the display driver circuitry and/or activating the memory of the display driver circuitry:

store the image, received from the at least one processor, associated with the second refresh rate, in the memory of the display driver circuitry, and perform scanning for displaying the image, stored in the memory, associated with the second refresh rate.

10. The electronic device of claim 1, wherein the display driver circuitry is configured to:

in response to a completion of the scanning performed by the display driver circuitry, perform a transition of the state of the signal from the second state to the first state.

11. The electronic device of claim 1, comprising:

memory comprising one or more storage media storing one or more programs executable by the at least one processor individually or collectively, wherein the one or more programs include instructions to cause the at least one processor to:

identify the state of the signal transmitted from the display driver circuitry to the at least one processor;

based on the state of the signal being identified as the first state, perform an image transmission from the at least one processor to the display driver circuitry; and based on the state of the signal being identified as the second state, defer an image transmission from the at least one processor to the display driver circuitry.

12. The electronic device of claim 11, wherein the one or more programs include instructions to cause the at least one processor to:

until the transition of the state of the signal from the first state to the second state is identified, defer a scheduled image transmission from the at least one processor to the display driver circuitry; and based on the transition of the state of the signal from the first state to the second state being identified, perform the deferred image transmission from the at least one processor to the display driver circuitry.

13. The electronic device of claim 11, wherein an image transmission from the at least one processor to the display driver circuitry is performed in response to a timing of a synchronization signal used for the at least one processor.

14. The electronic device of claim 13, wherein the synchronization signal comprises an emission synchronization signal.

15. The electronic device of claim 11, wherein the one or more programs include instructions to cause the at least one processor to:

identify a refresh rate for displaying via the display panel; and based on a refresh rate being identified as lower than a refresh rate threshold, transmit, to the display driver circuitry, at least one control command indicating storing an image transmitted from the at least one processor to the display driver circuitry and/or activating the memory of the display driver circuitry.

16. The electronic device of claim 1, wherein the display driver circuitry is configured to:

based on a refresh rate lower than a refresh rate threshold, activate transmitting the signal to the at least one processor; and based on a refresh rate higher than the refresh rate threshold, deactivate transmitting the signal to the at least one processor.

17. The electronic device of claim 16, wherein the memory of the display driver circuitry is deactivated while a refresh rate is higher than the refresh rate threshold.

18. A method of display driver circuitry of an electronic device with at least one processor and a display panel, the method comprising:

transmitting, to the at least one processor, a signal indicating whether an image transmission from the at least one processor to the display driver circuitry is allowed, wherein a state of the signal comprises:

a first state for allowing an image transmission from the at least one processor to the display driver circuitry, and a second state for disallowing an image transmission from the at least one processor to the display driver circuitry; and based on scanning being performed by the display driver circuitry for displaying an image via the display panel, performing a transition of the state of the signal from the first state to the second state, wherein a timing at which the transition of the state of the signal from the first state to the second state is performed is determined based on whether a vertical sync start (VSS) packet is received from the at least one processor.

19. The method of claim 18, comprising:

based on receiving a VSS packet from the at least one processor, performing the transition of the state of the signal from the first state to the second state at a start timing of scanning performed for displaying an image transmitted from the at least one processor with respect to the VSS packet.

20. The method of claim 18, comprising:

based on no VSS packet being received, performing scanning for displaying an image stored in the memory; and before a start timing of the scanning performed for displaying an image stored in the memory based on no VSS packet being received, performing the transition of the state of the signal from the first state to the second state.

* * * * *